United States Patent
Fang

(10) Patent No.: US 9,048,742 B2
(45) Date of Patent: *Jun. 2, 2015

(54) SYSTEMS AND METHODS FOR ADJUSTING CURRENT CONSUMPTION OF CONTROL CHIPS TO REDUCE STANDBY POWER CONSUMPTION OF POWER CONVERTERS

(71) Applicant: ON-BRIGHT ELECTRONICS (SHANGHAI) CO., LTD., Shanghai (CN)

(72) Inventor: Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,463

(22) Filed: Sep. 23, 2013

(65) Prior Publication Data

US 2014/0021786 A1 Jan. 23, 2014

Related U.S. Application Data

(63) Continuation of application No. 13/344,870, filed on Jan. 6, 2012, now Pat. No. 8,611,106.

(60) Provisional application No. 61/432,130, filed on Jan. 12, 2011.

(51) Int. Cl.
*H02M 3/335* (2006.01)
*H02M 7/217* (2006.01)
*H02M 1/00* (2006.01)

(52) U.S. Cl.
CPC ........ *H02M 3/33523* (2013.01); *H02M 7/2176* (2013.01); *H02M 2001/0006* (2013.01); *H02M 2001/0035* (2013.01); *Y02B 70/16* (2013.01)

(58) Field of Classification Search
USPC ........ 363/20, 21.01, 21.04–21.18, 37, 44, 49, 363/56.03, 56.04, 56.05
See application file for complete search history.

(56) References Cited

U.S. PATENT DOCUMENTS

| | | | |
|---|---|---|---|
| 7,652,461 B2 * | 1/2010 | Tateishi | 323/284 |
| 8,102,683 B2 * | 1/2012 | Gaknoki et al. | 363/56.11 |
| 8,149,601 B2 * | 4/2012 | Xiaowu et al. | 363/21.12 |
| 8,363,369 B2 * | 1/2013 | Lin et al. | 361/91.1 |
| 2006/0119340 A1 * | 6/2006 | Tateishi | 323/284 |
| 2010/0008108 A1 * | 1/2010 | Xiaowu et al. | 363/21.15 |
| 2010/0201335 A1 * | 8/2010 | Li et al. | 323/284 |
| 2010/0259956 A1 * | 10/2010 | Sadwick et al. | 363/50 |

* cited by examiner

*Primary Examiner* — Adolf Berhane
*Assistant Examiner* — Nusrat Quddus
(74) *Attorney, Agent, or Firm* — Jones Day

(57) ABSTRACT

System and method for regulating a power conversion system. For example, a system controller includes a signal generator and one or more power-consumption components. The signal generator is configured to receive a feedback signal related to an output signal of the power conversion system, a current sensing signal and an input voltage, and to generate a control signal based on at least information associated with the feedback signal, the current sensing signal and the input voltage. The power-consumption components are configured to receive the control signal. The signal generator is further configured to determine whether the feedback signal is smaller than a feedback threshold for a first predetermined period of time, the current sensing signal is smaller than a current sensing threshold for a second predetermined period of time, and the input voltage is smaller than a first threshold for a third predetermined period of time in magnitude.

41 Claims, 13 Drawing Sheets

SYSTEMS AND METHODS FOR ADJUSTING CURRENT CONSUMPTION OF CONTROL CHIPS TO REDUCE STANDBY POWER CONSUMPTION OF POWER CONVERTERS

1. CROSS-REFERENCES TO RELATED APPLICATIONS

This application is a continuation of U.S. patent application Ser. No. 13/344,870, filed Jan. 6, 2012, which claims priority to U.S. Provisional Application No. 61/432,130, filed Jan. 12, 2011, both applications being commonly assigned and incorporated by reference herein for all purposes.

2. BACKGROUND OF THE INVENTION

The present invention is directed to integrated circuits. More particularly, the invention provides a system and method for reducing standby power consumption. Merely by way of example, the invention has been applied to a power converter. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

The power converters include linear converters and switch-mode converters. The switch-mode converters often have higher efficiency than the linear converters. Additionally, the switch-mode converters usually use pulse-width-modulated (PWM) or pulse-frequency-modulated (PFM) mechanisms. Moreover, a PWM switch-mode converter can be either an offline flyback converter or a forward converter.

The switch-mode converters can consume significant power under standby conditions, such as with light or zero output loads. But the switch-mode converters need to meet various international standards concerning energy saving, such as requirements for Energy Star or Blue Angel. Therefore, the switch-mode converters should have low standby power consumption and high power efficiency under light or no load conditions. The no load conditions include, for example, standby, suspend or some other idle conditions. In another example, the standby power consumption includes energy losses at various components of the switch-mode converters such as power switches, transformers, inductors, and snubbers. These losses often increase with the switching frequency.

To reduce the standby power, the switching frequency is usually lowered for light or zero output loads. But if the switching frequency becomes too low and falls within the audio range, unwanted audible noises arise. One way to avoid these audible noises but also reduce standby power is to operate the switch-mode converters in the burst mode. In the burst mode, from time to time, some PWM cycles are skipped and the operation can become asynchronous depending on the load conditions.

FIG. 1(A) is a simplified diagram showing a conventional off-line flyback converter. The converter 100 includes a chip 110 for PWM control, a power switch 120, a primary winding 130, a secondary winding 132, an auxiliary winding 134, diodes 140, 142, and 144, capacitors 150, 152 and 154, resistors 160, 162, 164 and 166, an isolated feedback component 170, an electromagnetic interference filter 180, and an input rectifier and filter component 182.

FIG. 1(B) is a simplified diagram showing the conventional chip 110 for PWM control. The chip 110 for PWM control includes a PWM controller component 220, a gate driver 230, an oscillator 240, a protection component 242, a current and voltage generator 244, a leading-edge-blanking component 246, and an over-current comparator 248. Also, the chip 110 for PWM control includes terminals 112, 114, 116, and 118. For example, the PWM controller component 220 includes a PWM comparator 222 and a logic controller 224. In another example, the protection component 242 includes one or more components for over-voltage protection, over-temperature protection, over-current protection (OCP), and/or over-power protection (OPP). In yet another example, the current and voltage generator 244 is configured to generate one or more voltages and/or one or more currents.

FIG. 1(C) is a simplified diagram showing the conventional isolated feedback component 170. The isolated feedback component 170 includes resistors 172, 173 and 174, a capacitor 175, an error amplifier 176, and a photo coupler 178 that includes a photodiode 184 and a phototransistor 186.

Referring to FIG. 1(A) and FIG. 1(B), the converter 100 provides an output voltage 199 (e.g., $V_o$) and an output current (e.g., $I_o$) to an output load 168, such as an output resistor. In more detail, the PWM controller component 220 generates a PWM signal 232, which is received by the gate driver 230. In response, the gate driver 230 sends a gate signal 192 to the power switch 120 through the terminal 112. Accordingly, the power switch 120 adjusts the current 122 flowing through the primary winding 130. For example, if the power switch 120 is turned on, the power switch 120 is closed, allowing the current 122 to flow through the primary winding 130. In another example, if the power switch is turned off, the power switch 120 is open, thus not allowing the current 122 to flow through the primary winding 130.

The current 122 is sensed by the resistor 166 and converted into a current sensing signal 194 (e.g., $V_{cs}$) through the terminal 114 and the leading-edge-blanking component 246. The current sensing signal 194 is received by the OCP comparator 248 and compared with an over-current threshold signal 195 (e.g., $V_{th\_oc}$). In response, the OCP comparator 248 sends an over-current control signal 249 to the logic controller 224. When the current of the primary winding is greater than a limiting level, the PWM controller component 220 turns off the power switch 120 and shuts down the switch-mode power converter 100, thus limiting the current 122 flowing through the primary winding 130 and protecting the switch-mode power converter 100.

As shown in FIG. 1(A), FIG. 1(B) and FIG. 1(C), the output voltage 199 (e.g., $V_o$) of the secondary winding 132 is sensed by the isolated feedback component 170. In response, the isolated feedback component 170 sends a feedback signal 198 (e.g., $V_{FB}$) to the PWM comparator 222 through the terminal 118. The PWM comparator 222 also receives the current sensing signal 194 and generates a PWM comparator output signal 223. The PWM comparator output signal 223 is received by the logic controller 224, which generates the PWM signal 232 based on at least information associated with the PWM comparator output signal 223.

The chip 110 for PWM control is powered by the auxiliary winding 134, the diode 140, the capacitor 150, and the resistor 160 through the terminal 116. When the power switch 120 is turned on, the energy is taken from the input and stored in the primary winding 130. Also, the diode 144 is reverse biased, thus the output load 168 is powered by the energy stored in the capacitor 154.

When the power switch 120 is turned off, some energy stored in the primary winding 130 is transferred to the secondary winding 132 that is coupled to the primary winding 130. Consequently, the diode 144 becomes forward-biased, and the energy is delivered to the capacitor 154 and to the output load 168. The output voltage 199 (e.g., $V_o$) is also reflected back to the primary winding 130, causing an increase of the drain voltage of the power switch 120 that includes a field effect transistor (FET).

Additionally, when the power switch 120 is turned off, the energy stored in the primary winding 130 is also transferred to the auxiliary winding 134 that is coupled to the primary winding 130. Consequently, the diode 140 becomes forward biased, and some energy stored in the primary winding is delivered to the capacitor 150 and used to provide a chip supply voltage 196 (e.g., $V_{DD}$) to the chip 110 through the terminal 116. The combination of the auxiliary winding 134, the diode 140, the capacitor 150, and the resistor 160 is called the self-supply circuit.

FIG. 2 is a simplified conventional diagram showing burst mode operation for the converter 100. The waveform 202 represents the output voltage 199 (e.g., $V_o$) as a function of time, the waveform 204 represents the feedback signal 198 as a function of time, the waveform 206 represents the current 122 that flows through the power switch 120 as a function of time, and the waveform 208 represents a drain-source voltage of the power switch 120 that includes a FET.

As shown in FIG. 2, $T_{on}$ is the burst-on time, and $T_{off}$ is the burst-off time. During $T_{on}$, the drive signal 192 turns on and off the power switch 120 at a switching frequency that is above an audio frequency range, and during $T_{off}$, the power switch 120 remains being turned off. Also, $T_{burst}$ denotes the burst period that is equal to $T_{on}$ plus $T_{off}$, and $T_{on}/T_{burst}$ represents the burst duty cycle. For example, the burst period depends on the load conditions. In another example, the burst duty cycle is reduced in order to lower the standby power at a given switching frequency. Specifically, the standby power can be lowered by reducing the burst-on time and/or increasing the burst-off time.

But the burst-on time and the burst-off time can also be constrained by the current consumption of the chip 110 for PWM control. Referring to FIG. 1(A), the output voltage 199 (e.g., $V_o$) and the chip supply voltage 196 (e.g., $V_{DD}$) are related to each other as follows:

$$V_{DD} = \frac{V_o V_{fb}}{N_s} \times N_a - V_{fa} \quad \text{(Equation 1)}$$

where $N_s$ and $N_a$ represent the number of turns of the secondary winding 132 and the number of turns of the auxiliary winding 134 respectively. Additionally, $V_{fa}$ and $V_{fb}$ represent the forward voltage of the diode 140 and the forward voltage of the diode 144 respectively. According to Equation 1, the chip supply voltage 196 (e.g., $V_{DD}$) increases with the increasing output voltage 199 (e.g., $V_o$), and decreases with the decreasing output voltage 199 (e.g., $V_o$).

Referring to FIG. 2, during $T_{off}$, the power switch 120 is turned off, causing both the output voltage 199 (e.g., $V_o$) and the chip supply voltage 196 (e.g., $V_{DD}$) to drop. If the chip supply voltage 196 (e.g., $V_{DD}$) becomes smaller than the under-voltage lockout (UVLO) threshold, the chip 110 for PWM control is powered off. Subsequently, a start-up process is initiated. Often, the start-up process can take several seconds, during which, the output voltage 199 (e.g., $V_o$) becomes out of regulation and hence falls off.

Therefore, to maintain the output regulation, it is important to keep the chip supply voltage 196 (e.g., $V_{DD}$) above the UVLO threshold, and the burst duty cycle $T_{on}/T_{burst}$ also above a minimum level. The minimum level of the burse duty cycle is used to maintain the appropriate balance between charging and discharging of the capacitor 150 in order to keep the chip supply voltage 196 (e.g., $V_{DD}$) above the UVLO threshold.

FIG. 3 is a simplified conventional diagram showing a relationship between the chip supply voltage 196 (e.g., $V_{DD}$) and the output voltage 199 (e.g., $V_o$) under different load conditions. In Region C, under normal and heavy load conditions, the chip supply voltage 196 (e.g., $V_{DD}$) drifts higher since the charging of the capacitor 150 is stronger than the discharging of the capacitor 150. In contrast, in Region A, under no load conditions, the chip supply voltage 196 (e.g., $V_{DD}$) drifts lower since the charging of the capacitor 150 is weaker than the discharging of the capacitor 150. Furthermore, the chip supply voltage 196 (e.g., $V_{DD}$) may drop further below the UVLO threshold, and thus enter into Region D. Then, the chip 110 for PWM control is powered down, hence no switching is performed, and no energy is delivered to the output load 168 or the capacitor 150.

Afterwards, the capacitor 150 is recharged through the resistor 162. If the chip supply voltage $V_{DD}$ rises above a start-up threshold, the chip 110 for PWM control resumes operations as shown by Region A. But if the charging of the capacitor 150 remains weak, the chip supply voltage 196 (e.g., $V_{DD}$) can again fall below the UVLO threshold, as shown by Region D. Consequently, the converter 100 ends up changing back and forth between Region A and Region D. The output of the converter 100 remains out of regulation, and no regulated output voltage can be obtained.

Referring to FIG. 1(A) and FIG. 1(B), the output regulation is accomplished through the isolated feedback component 170. The isolated feedback component 170 receives the output voltage 199 (e.g., $V_o$) and sends the feedback signal 198 to the chip 110 through the terminal 118. The feedback signal 198 represents the output voltage 199 (e.g., $V_o$). Hence the drive signal 192 with PWM modulation is controlled by at least the feedback signal 198 in order to regulate the output voltage 199 (e.g., $V_o$) to the desired voltage level.

In contrast, the chip supply voltage 196 (e.g., $V_{DD}$) is not regulated. The variation in the chip supply voltage 196 is not corrected through any feedback loop. To keep the chip supply voltage 196 above the UVLO threshold, a dummy load often is added to the output of the converter 100 in order to maintain the output regulation even under no load conditions. But the dummy load consumes a constant power and hence degrades the power efficiency of the converter 100, especially under light or no load conditions.

Hence it is highly desirable to improve the techniques for reducing standby power consumption.

3. BRIEF SUMMARY OF THE INVENTION

The present invention is directed to integrated circuits. More particularly, the invention provides a system and method for reducing standby power consumption. Merely by way of example, the invention has been applied to a power converter. But it would be recognized that the invention has a much broader range of applicability.

According to one embodiment, a system controller for regulating a power conversion system includes a signal generator configured to receive a feedback signal related to an output signal of a power conversion system, a current sensing signal and an input voltage, and to generate a control signal based on at least information associated with the feedback signal, the current sensing signal and the input voltage, the current sensing signal representing one or more peak magnitudes related to a primary current flowing through a primary winding of the power conversion system, and one or more power-consumption components configured to receive the control signal. The one or more power-consumption components are further configured to reduce power consumption if the control signal indicates the feedback signal is smaller than a feedback threshold for a first predetermined period of time, the current sensing signal is smaller than a current sensing threshold for a second predetermined period of time, and the input voltage is smaller than a first threshold for a third predetermined period of time in magnitude. Each of the first predetermined period of time, the second predetermined period of time, and the third predetermined period of time is equal to or larger than zero in magnitude.

According to another embodiment, a system controller for regulating a power conversion system includes a signal generator configured to receive a feedback signal related to an output signal of a power conversion system, a current sensing signal and an input voltage, and to generate a control signal based on at least information associated with the feedback signal, the current sensing signal and the input voltage, the current sensing signal representing one or more peak magnitudes related to a primary current flowing through a primary winding of the power conversion system, and one or more power-consumption components configured to receive the control signal. The one or more power-consumption components are further configured to reduce power consumption if the control signal indicates the feedback signal is larger than a feedback threshold for a first predetermined period of time, the current sensing signal is smaller than a current sensing threshold for a second predetermined period of time, and the input voltage is smaller than a first threshold for a third predetermined period of time in magnitude. Each of the first predetermined period of time, the second predetermined period of time, and the third predetermined period of time is equal to or larger than zero in magnitude.

According to yet another embodiment, a system controller for regulating a power conversion system includes a first resistor including a first resistor terminal and a second resistor terminal, the first resistor terminal being biased to a first predetermined voltage, a second resistor including a third resistor terminal and a fourth resistor terminal, the third resistor terminal being connected to the second resistor terminal, the fourth resistor terminal configured to receive a feedback signal related to an output signal of a power conversion system, a transistor including a first transistor terminal, a second transistor terminal, and a third transistor terminal, the first transistor terminal being connected to the second resistor terminal and the third resistor terminal, the second transistor terminal being configured to receive a second predetermined voltage, the third transistor terminal being configured to receive the feedback signal, a modulation component configured to receive the feedback signal and generate a modulation signal, and a gate driver configured to receive the modulation signal and output a drive signal to a switch for adjusting a primary current flowing through a primary winding of the power conversion system.

According to yet another embodiment, a method for regulating a power conversion system includes receiving a feedback signal related to an output signal of a power conversion system, a current sensing signal and an input voltage, the current sensing signal representing one or more peak magnitudes related to a primary current flowing through a primary winding of the power conversion system, processing information associated with the feedback signal, the current sensing signal and the input voltage, and generating a control signal based on at least information associated with the feedback signal, the current sensing signal and the input voltage. The method further includes receiving the control signal, processing information associated with the control signal, and, if the control signal indicates the feedback signal is smaller than a feedback threshold for a first predetermined period of time, the current sensing signal is smaller than a current sensing threshold for a second predetermined period of time, and the input voltage is smaller than a first threshold for a third predetermined period of time in magnitude, reducing power consumption of one or more power consumption components. Each of the first predetermined period of time, the second predetermined period of time, and the third predetermined period of time is equal to or larger than zero in magnitude.

Many benefits are achieved by way of the present invention over conventional techniques. Certain embodiments of the present invention provide a method to reduce standby power consumption in pulse width modulation (PWM) controlled switch mode power converters including but not limited to an offline fly-back converter, and a forward converter. Some embodiments of the present invention provide a method to intelligently and dynamically manage internal current consumption of a PWM controller IC to reduce the overall standby power consumption of a power converter.

Certain embodiments of the present invention provide a method to reduce internal current consumption under light load or no load conditions to reduce the overall standby power consumption of a switching power converter. For example, the current consumption of a PWM controller is dynamically managed in response to different load conditions. In another example, the current consumption of the PWM controller is reduced under light load or no load conditions by powering down some functional blocks which are not necessary under those conditions. In yet another example, meanwhile, the current consumption of other function blocks is reduced without degrading dynamic performance of the switching power converter under light load or no load conditions. Charges held on a power-supply holding capacitor supply the PWM controller for a long time without switching thus results in low standby power consumption in some embodiments of the present invention.

Certain embodiments of the present invention provide a method to manage current consumption of a PWM controller that works in several power modes, such as a normal operation mode, a power saving mode, and a power dissipation mode. For example, in a power saving mode, the current consumption of the PWM controller is reduced in order to reduce standby power consumption. In another example, in a power dissipation mode, the PWM controller consumes more power than in a normal operation mode to prevent a power supply voltage of the PWM controller from drifting high to protect the PWM controller.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides a system and method for reducing standby power consumption. Merely by way of example, the invention has been applied to a power converter. But it would be recognized that the invention has a much broader range of applicability.

As discussed above, the dummy load is used to prevent the chip supply voltage 196 (e.g., $V_{DD}$) from dropping below the UVLO threshold if the charging of the capacitor 150 is insufficient to balance the current consumption of the chip 110. When the power switch 120 is turned off, the drop rate of the chip supply voltage 196 (e.g., $V_{DD}$) depends on the current consumption of the chip 110.

If the current consumption of the chip 110 becomes larger, the chip supply voltage $V_{DD}$ drops faster. Consequently, a larger dummy load is needed in order to maintain the balance between charging and discharging of the capacitor 150 and prevent the chip supply voltage 196 (e.g., $V_{DD}$) from falling below the UVLO threshold. But the larger dummy load results in higher standby power.

Figure 1A:
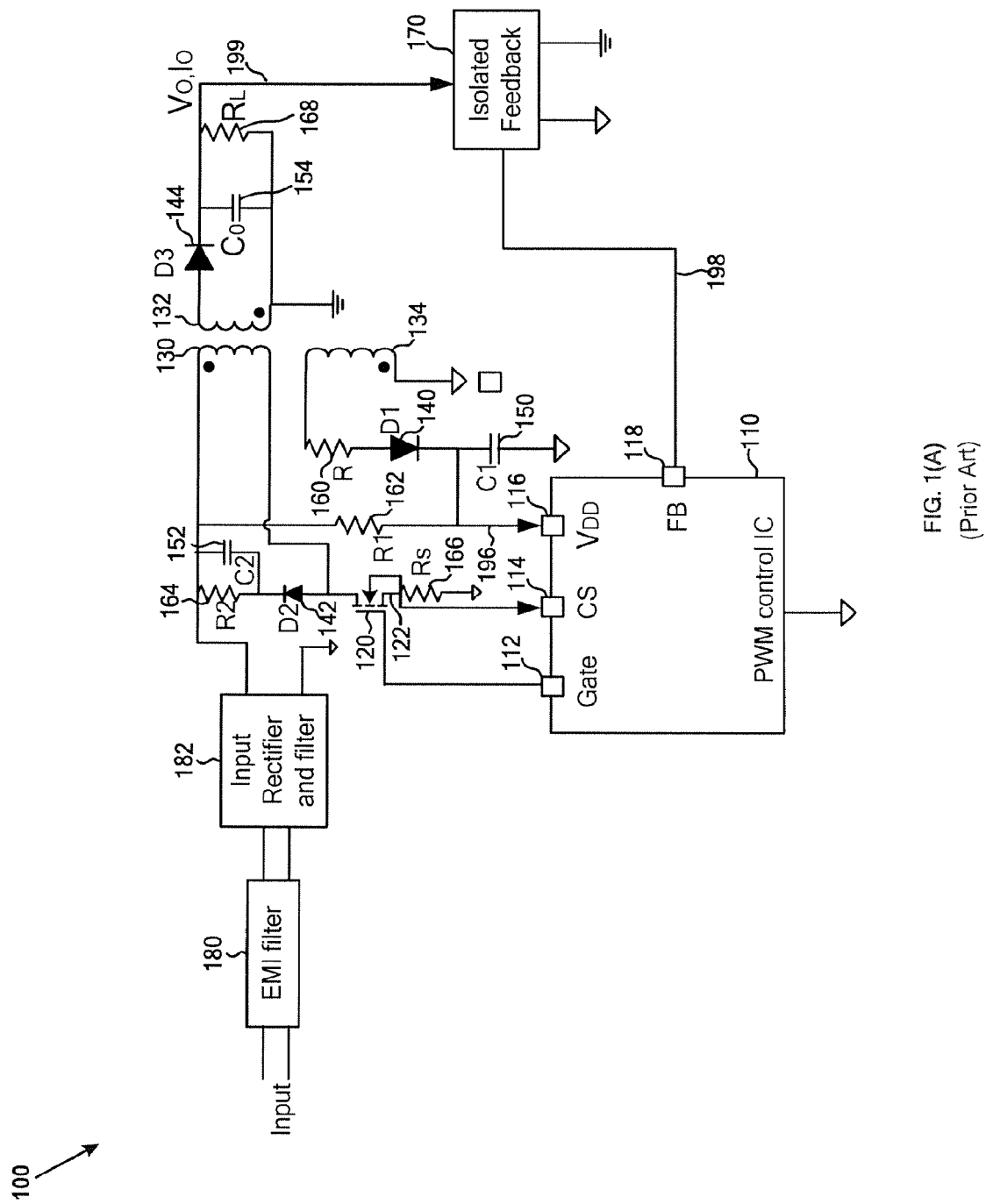
FIG. 1(A) is a simplified diagram showing a conventional off-line flyback converter.
Figure 1B:
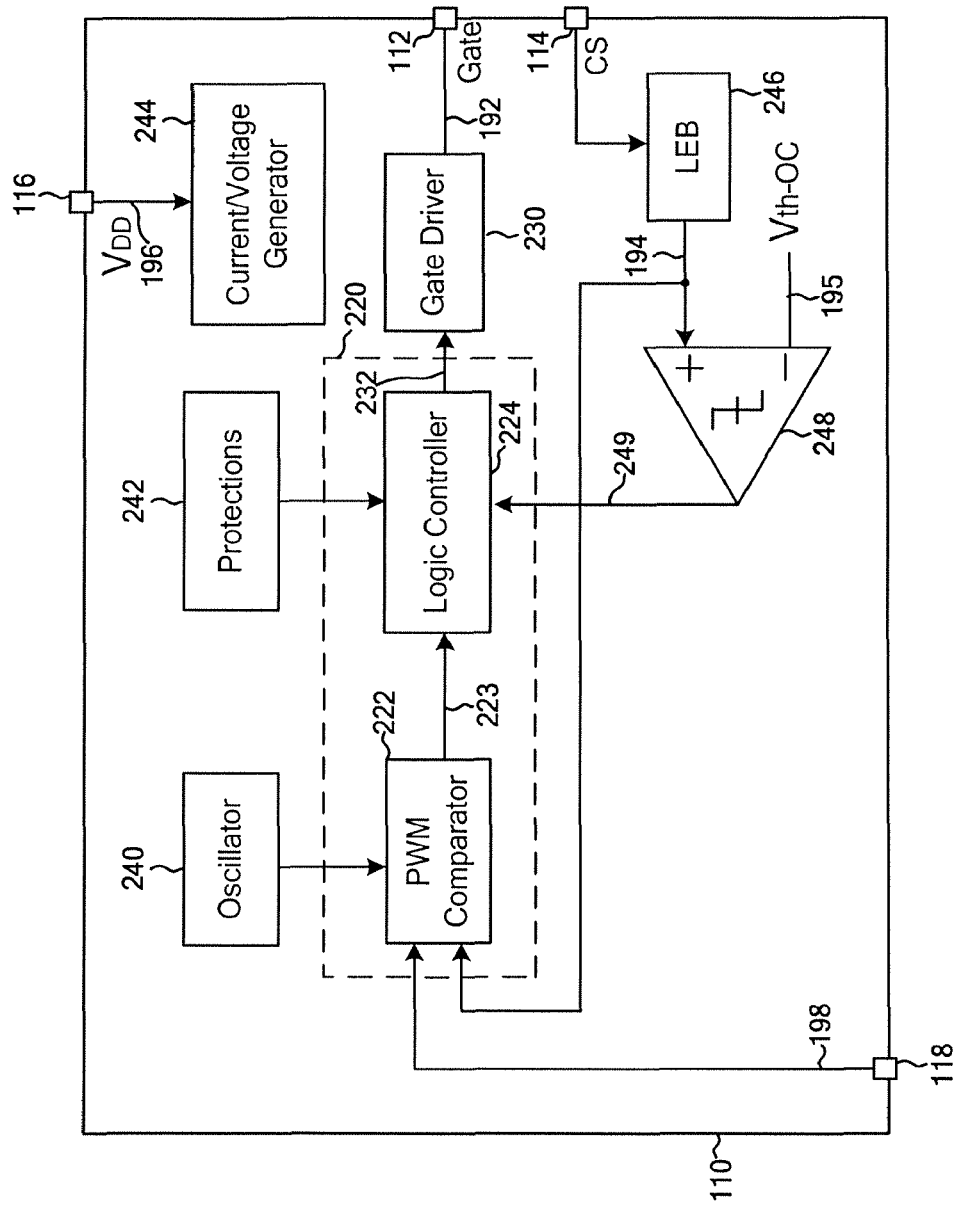
FIG. 1(B) is a simplified diagram showing the conventional chip of FIG. 1(A) for PWM control.
Figure 1C:
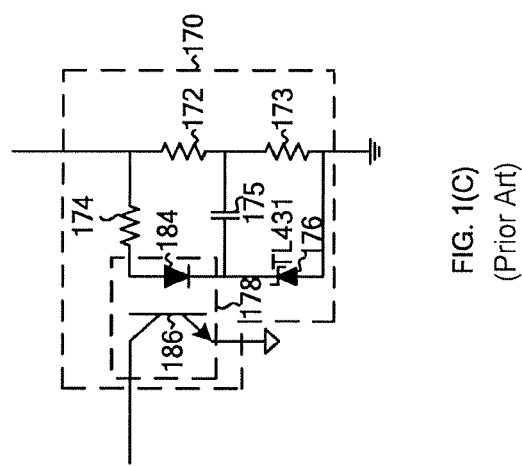
FIG. 1(C) is a simplified diagram showing the conventional isolated feedback component of FIG. 1(A).
Figure 2:
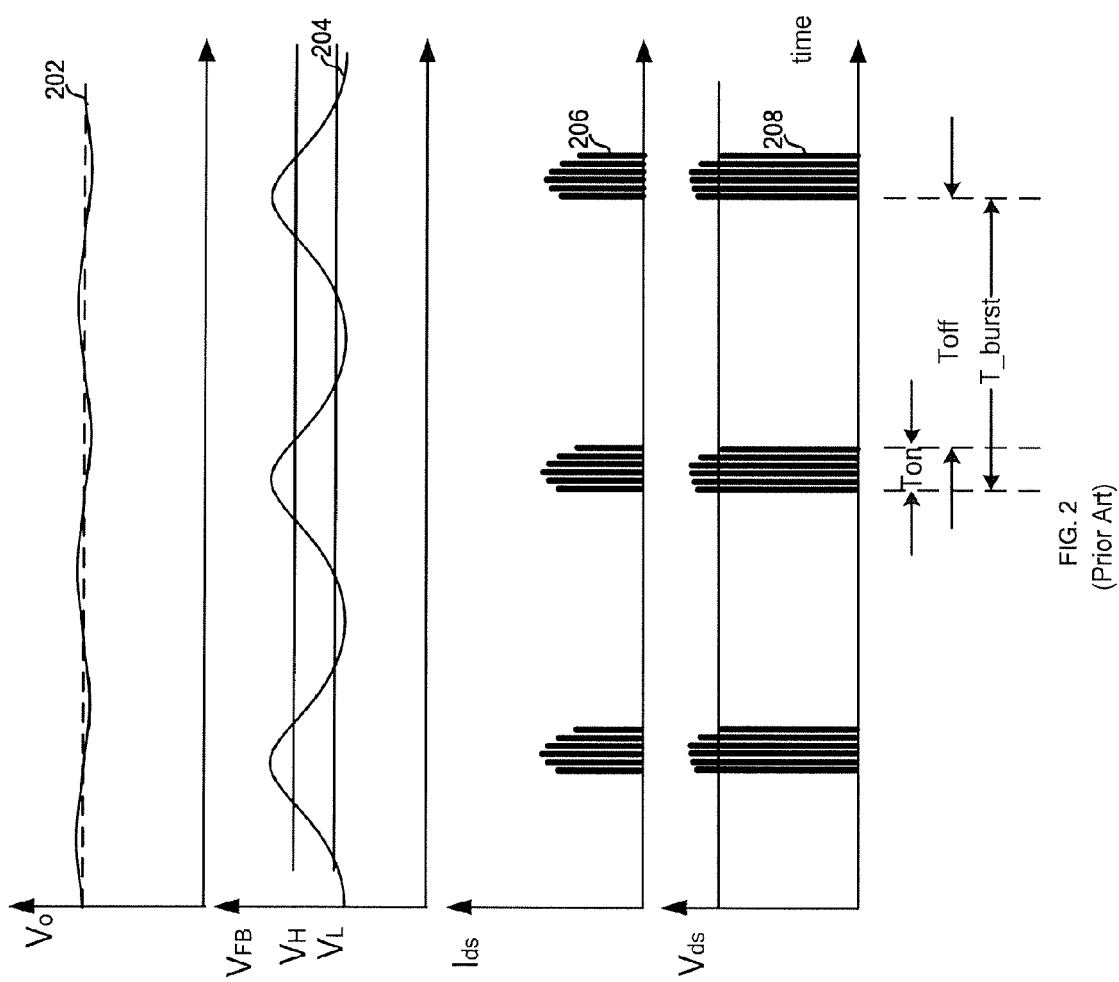
FIG. 2 is a simplified conventional diagram showing burst mode operation for the converter of FIG. 1(A).
Figure 3:
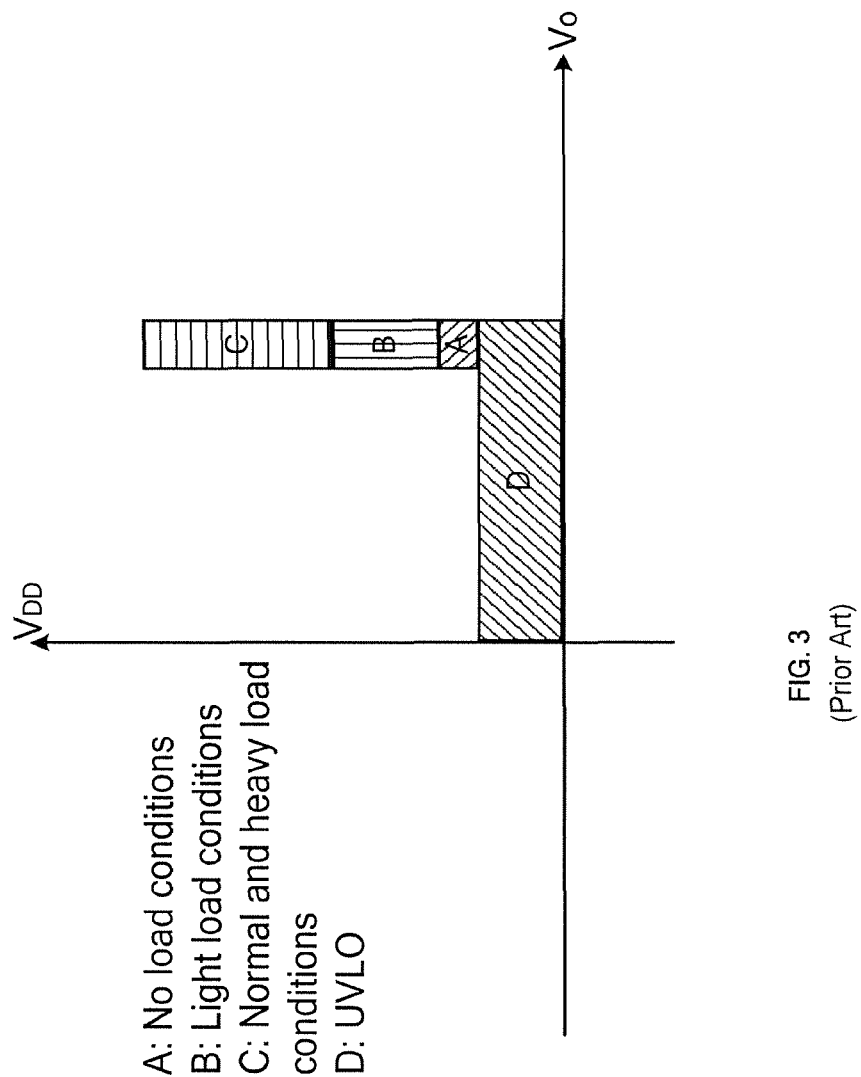
FIG. 3 is a simplified conventional diagram showing a relationship between the chip supply voltage and the output voltage as shown in FIG. 1(A) and FIG. 1(B) under different load conditions.
Figure 4:
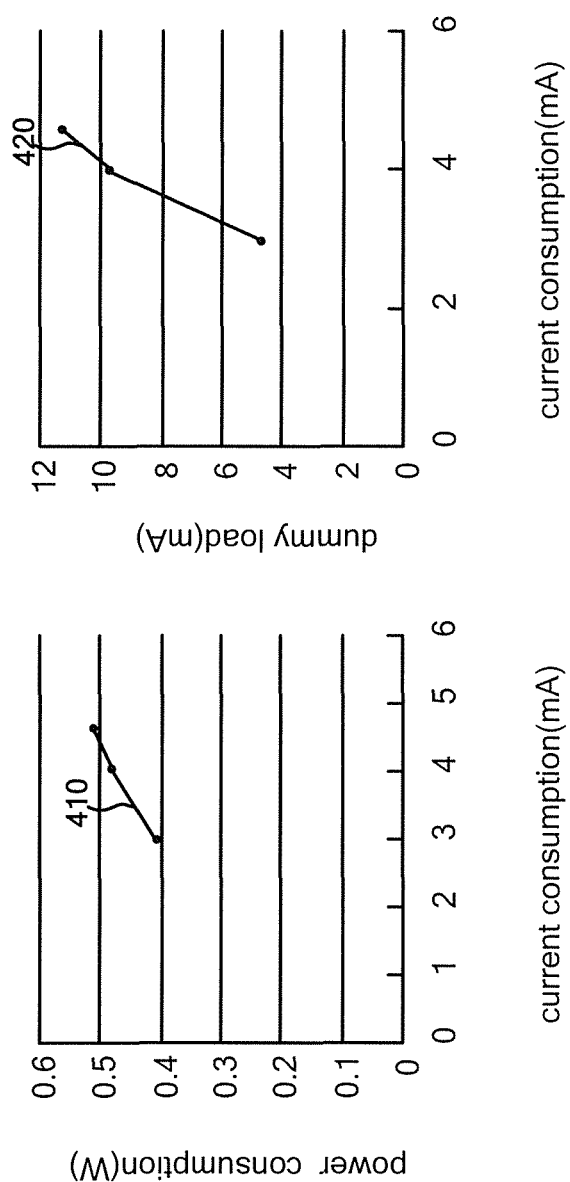
FIG. 4 shows a simplified diagram showing standby power consumption and dummy load as functions of current consumption of the chip of FIG. 1(A) for PWM control according to one embodiment.

FIG. 4 shows a simplified diagram showing standby power consumption and dummy load as functions of current consumption of the chip 110 for PWM control according to one embodiment. A curve 410 represents the standby power consumption as a function of current consumption of the chip 110, and a curve 420 represents the dummy load as a function of current consumption of the chip 110. As shown in FIG. 4, the dummy load and the standby power consumption increase with the current consumption of the chip 110. Therefore, reducing the current consumption of the chip 110 is important for lowering standby power consumption according to certain embodiments.

Figure 5:
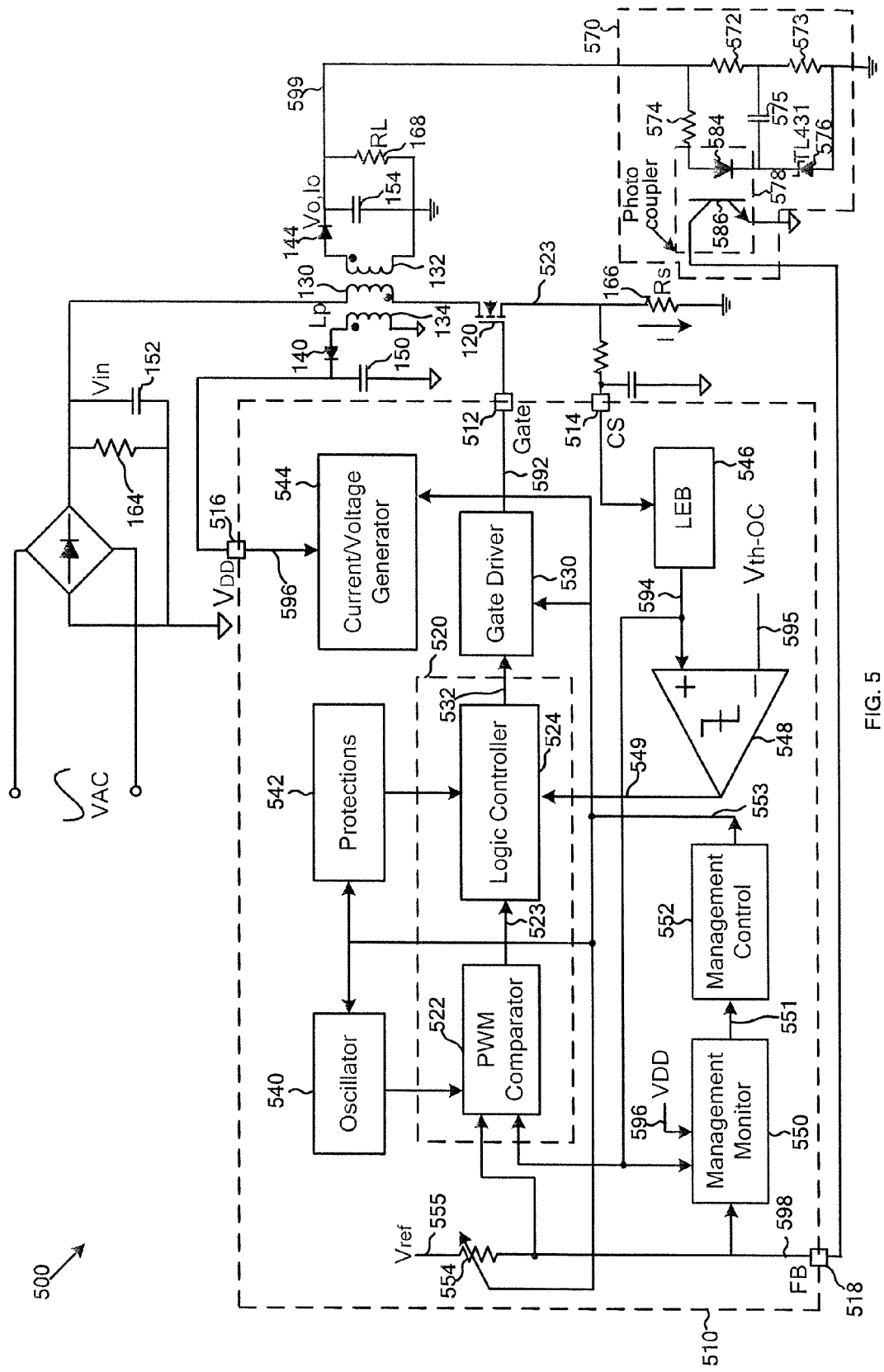
FIG. 5 is a simplified diagram showing a power converter with dynamic management of chip current consumption for PWM control according to an embodiment of the present invention.

FIG. 5 is a simplified diagram showing a power converter with dynamic management of chip current consumption for PWM control according to an embodiment of the present invention. This diagram is merely an example, which should not unduly limit the scope of the claims. One of ordinary skill in the art would recognize many variations, alternatives, and modifications.

The converter 500 includes a chip 510 for PWM control, the power switch 120, the primary winding 130, the secondary winding 132, the auxiliary winding 134, the diodes 140 and 144, the capacitors 150, 152 and 154, the resistors 164 and 166, and an isolated feedback component 570. The chip 510 for PWM control includes a PWM controller component 520, a gate driver 530, an oscillator 540, a protection component 542, a current and voltage generator 544, a leading-edge-blanking component 546, an over-current comparator 548, a management monitoring component 550, a management control component 552, and an adjustable resistor 554. Also, the chip 510 for PWM control includes terminals 512, 514, 516, and 518.

In one embodiment, the PWM controller component 520, the gate driver 530, the leading-edge-blanking component 546, and the over-current comparator 548 are the same as the PWM controller component 220, the gate driver 230, the leading-edge-blanking component 246, and the over-current comparator 248, respectively.

For example, the PWM controller component 520 includes a PWM comparator 522 and a logic controller 524. In another example, the isolated feedback component 570 includes resistors 572, 573 and 574, a capacitor 575, an error amplifier 576, and a photo coupler 578. In yet another example, the converter 500 provides an output voltage 599 (e.g., $V_o$) and an output current (e.g., $I_o$) to the output load 168, such as the output resistor.

As shown in FIG. 5, the PWM controller component 520 generates a PWM signal 532, which is received by the gate driver 530 according to one embodiment. For example, the gate driver 530, in response, sends a gate signal 592 to the power switch 120 through the terminal 512 (e.g., terminal Gate). In another example, in response, the power switch 120 adjusts a current 593 flowing through the primary winding 130. In yet another example, the current 593 is sensed by the resistor 166 and converted into a current sensing signal 594 (e.g., $V_{cs}$) through the terminal 514 (e.g., terminal CS) and the leading-edge-blanking component 546. In yet another example, the current sensing signal 594 is received by the OCP comparator 548 and compared with an over-current threshold signal 595 (e.g., $V_{th\_oc}$). In response, the OCP comparator 548 sends an over-current control signal 549 to the logic controller 524 according to certain embodiments.

As shown in FIG. 5, the chip 510 for PWM control is powered by at least the auxiliary winding 134 and the capacitor 150 through the terminal 516 (e.g., terminal $V_{DD}$) according to one embodiment. For example, the capacitor 150 is used to provide a chip supply voltage 596 (e.g., $V_{DD}$) to the chip 510 through the terminal 516. In another example, the output voltage 599 (e.g., $V_o$) of the secondary winding 132 is sensed by the isolated feedback component 570. In yet another example, the isolated feedback component 570 generates a feedback signal 598 (e.g., $V_{FB}$) that is received by the adjustable resistor 554. In yet another example, both the PWM comparator 522 and the management monitoring component 550 also receive the feedback signal 598 through the terminal 518 (e.g., FB). In yet another example, the PWM comparator 522 also receives the current sensing signal 594 and generates a PWM comparator output signal 523. The PWM comparator output signal 523 is received by the logic controller 524, which generates the PWM signal 532 based on at least information associated with the PWM comparator output signal 523 according to one embodiment. For example, a feedback impedance associated with the terminal 518 (e.g., FB) changes with output load conditions.

Figure 6:
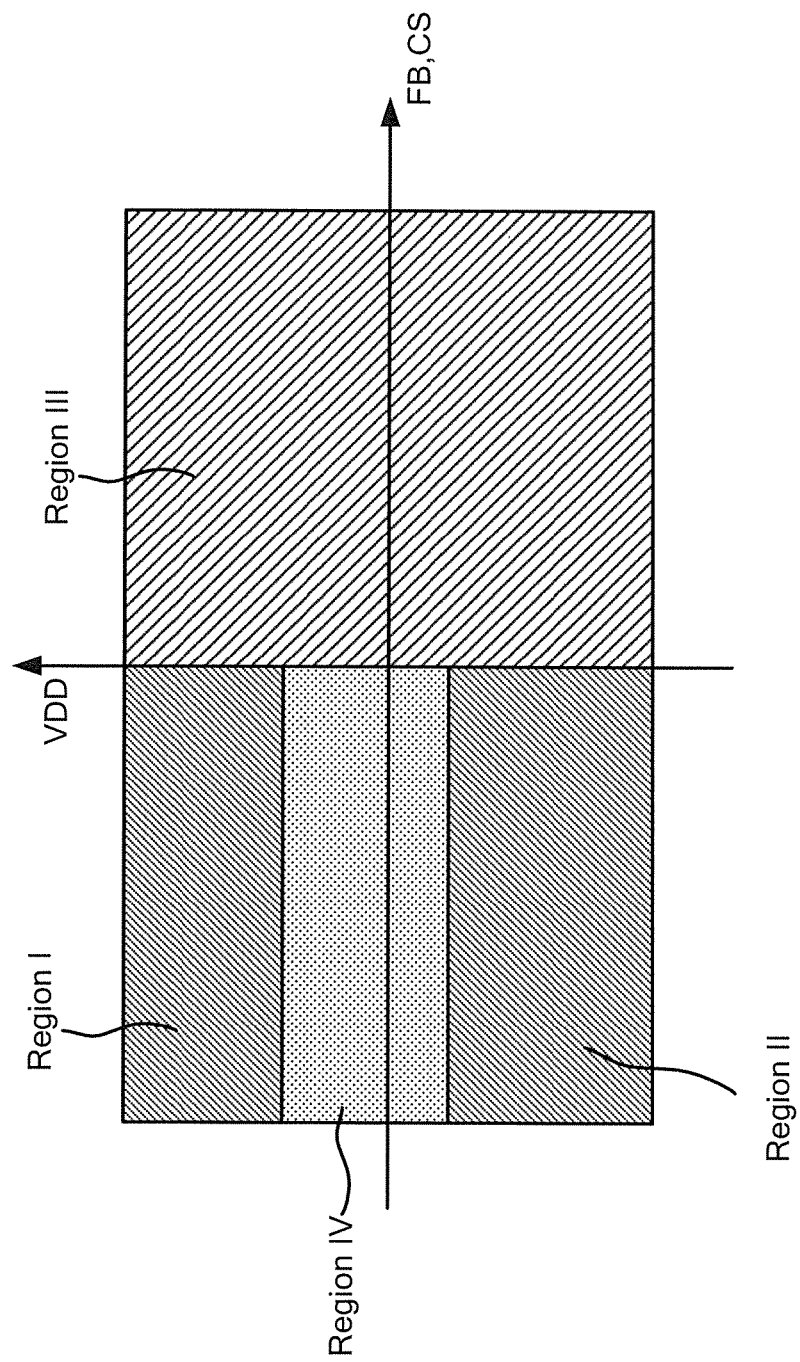
FIG. 6 is a simplified diagram showing dynamic management of chip current consumption by the power converter of FIG. 5 according to an embodiment of the present invention.

FIG. 6 is a simplified diagram showing dynamic management of chip current consumption by the power converter 500 according to an embodiment of the present invention. This diagram is merely an example, which should not unduly limit the scope of the claims. One of ordinary skill in the art would recognize many variations, alternatives, and modifications. For example, the dynamic management of chip current consumption is implemented by monitoring the feedback signal 598 (e.g., $V_{FB}$), the current sensing signal 594 (e.g., $V_{cs}$), and the chip supply voltage 596 (e.g., $V_{DD}$). In another example, current sensing signal 594 (e.g., $V_{cs}$) is used to determine the peak magnitude of the current 593.

According to one embodiment, if the feedback signal 598 (e.g., $V_{FB}$) is determined to be larger than a feedback threshold (e.g., $V_{FB\_th}$) in magnitude, and the current sensing signal 594 (e.g., $V_{cs}$ that represents the peak magnitude of the current 593) is determined to be larger than a current sensing threshold (e.g., $V_{cs\_th}$) in magnitude, the converter 500 operates in Region III. For example, in Region III, a normal or heavy load is recognized, and in response, the PWM controller component 520 operates in a normal mode with a relatively high switching frequency. In another example, in Region III, the drive signal 592 turns on and off the power switch 120 at the switching frequency. In yet another example, relatively high level of energy is delivered to the load by the converter 500 in Region III. In yet another example, the energy delivered from the primary winding 130 through the auxiliary winding 134 is relatively high and sufficient to supply the chip 510 for PWM control. All the functions, such as all the protection functions, are active under normal and heavy load conditions in Region III according to certain embodiments.

According to another embodiment, if the feedback signal 598 (e.g., $V_{FB}$) is determined to be smaller than the feedback threshold (e.g., $V_{FB\_th}$) in magnitude for a first predetermined period of time, and the current sensing signal 594 (e.g., $V_{cs}$) is determined to be smaller than the current sensing threshold (e.g., $V_{cs\_th}$) in magnitude for a second predetermined period of time, the converter 500 operates in Region I, Region II, or Region VI. For example, if the chip supply voltage 596 (e.g., $V_{DD}$) is determined to be lower than the supply lower threshold (e.g., $V_{DD\_th\_l}$) in magnitude for a third predetermined period of time, the converter 500 operates in Region II. In another example, if the chip supply voltage 596 (e.g., $V_{DD}$) is determined to be higher than the supply upper threshold (e.g., $V_{DD\_th\_h}$) in magnitude for a fourth predetermined period of time, the converter 500 operates in Region I. In yet another example, if the chip supply voltage 596 (e.g., $V_{DD}$) neither remains lower than the supply lower threshold (e.g., $V_{DD\_th\_l}$) in magnitude for the third predetermined period of time nor remains higher than the supply upper threshold (e.g., $V_{DD\_th\_h}$) in magnitude for the fourth predetermined period of time, the converter 500 operates in Region IV. In yet another example, each of the first predetermined period of time, the second predetermined period of time, the third predetermined period of time, and the fourth predetermined period of time is equal to or larger than zero in magnitude.

According to yet another embodiment, if the first predetermined period of time is equal to zero, then the converter 500 operates in Region I, Region II, or Region IV if the feedback signal 598 (e.g., $V_{FB}$) is determined to be smaller than the feedback threshold (e.g., $V_{FB\_th}$) in magnitude, and the current sensing signal 594 (e.g., $V_{cs}$) is determined to be smaller than the current sensing threshold (e.g., $V_{cs\_th}$) in magnitude for the second predetermined period of time. For example, if the second predetermined period of time is equal to zero, then the converter 500 operates in Region I, Region II, or Region IV if the feedback signal 598 (e.g., $V_{FB}$) is determined to be smaller than the feedback threshold (e.g., $V_{FB\_th}$) in magnitude for the first predetermined period of time, and the current sensing signal 594 (e.g., $V_{cs}$) is determined to be smaller than the current sensing threshold (e.g., $V_{cs\_th}$) in magnitude. In another example, if both the first predetermined period of time and the second predetermined period of time are equal to zero, then the converter 500 operates in Region I, Region II, or Region IV if the feedback signal 598 (e.g., $V_{FB}$) is determined to be smaller than the feedback threshold (e.g., $V_{FB\_th}$) in magnitude, and the current sensing signal 594 (e.g., $V_{cs}$) is determined to be smaller than the current sensing threshold (e.g., $V_{cs\_th}$) in magnitude.

According to yet another embodiment, if the third predetermined period of time is equal to zero, the converter 500 operates in Region II if the feedback signal 598 (e.g., $V_{FB}$) is determined to be smaller than the feedback threshold (e.g., $V_{FB\_th}$) in magnitude for the first predetermined period of time, the current sensing signal 594 (e.g., $V_{cs}$) is determined to be smaller than the current sensing threshold (e.g., $V_{cs\_th}$) in magnitude for the second predetermined period of time, and the chip supply voltage 596 (e.g., $V_{DD}$) is determined to be lower than the supply lower threshold (e.g., $V_{DD\_th\_l}$) in magnitude. For example, if the fourth predetermined period of time is equal to zero, the converter 500 operates in Region I if the feedback signal 598 (e.g., $V_{FB}$) is determined to be smaller than the feedback threshold (e.g., $V_{FB\_th}$) in magnitude for the first predetermined period of time, the current sensing signal 594 (e.g., $V_{cs}$) is determined to be smaller than the current sensing threshold (e.g., $V_{cs\_th}$) in magnitude for the second predetermined period of time, and the chip supply voltage 596 (e.g., $V_{DD}$) is determined to be higher than the supply upper threshold (e.g., $V_{DD\_th\_h}$) in magnitude. In yet another example, if both the third predetermined period of time and the fourth predetermined period of time are equal to zero, the converter 500 operates in Region IV if the feedback signal 598 (e.g., $V_{FB}$) is determined to be smaller than the feedback threshold (e.g., $V_{FB\_th}$) in magnitude for the first predetermined period of time, the current sensing signal 594 (e.g., $V_{cs}$) is determined to be smaller than the current sensing threshold (e.g., $V_{cs\_th}$) in magnitude for the second predetermined period of time, and the chip supply voltage 596 (e.g., $V_{DD}$) neither remains lower than the supply lower threshold (e.g., $V_{DD\_th\_l}$) in magnitude nor remains higher than the supply upper threshold (e.g., $V_{DD\_th\_h}$) in magnitude.

According to yet another embodiment, the first predetermined period of time, the second predetermined period of time, the third predetermined period of time, and the fourth predetermined period of time are all equal to zero. For example, if the feedback signal 598 (e.g., $V_{FB}$) is determined to be smaller than the feedback threshold (e.g., $V_{FB\_th}$) in magnitude, and the current sensing signal 594 (e.g., $V_{cs}$ that represents the peak magnitude of the current 593) is determined to be smaller than the current sensing threshold (e.g., $V_{cs\_th}$) in magnitude, the converter 500 operates in Region I, Region II, or Region VI. For example, if the chip supply voltage 596 (e.g., $V_{DD}$) is determined to be higher than the supply upper threshold (e.g., $V_{DD\_th\_h}$), the converter 500 operates in Region I. In another example, if the chip supply voltage 596 (e.g., $V_{DD}$) is determined to be lower than the supply lower threshold (e.g., $V_{DD\_th\_l}$), the converter 500 operates in Region II. In yet another example, if the chip supply voltage 596 (e.g., $V_{DD}$) is determined to be lower than the supply upper threshold (e.g., $V_{DD\_th\_l}$) and higher than the supply lower threshold (e.g., $V_{DD\_th\_l}$), the converter 500 operates in Region IV.

In one embodiment, a light or no load condition is recognized with respect to Regions I, II, and IV. For example, the switching frequency is set to a relatively low level, and the PWM controller component 520 operates in the burst mode. In another example, relatively low energy is delivered from the primary winding 130 through the auxiliary winding 134 to the capacitor 150 in Regions I, II, and IV.

In another embodiment, if the chip supply voltage 596 (e.g., $V_{DD}$) is determined to be lower than the supply lower threshold (e.g., $V_{DD\_th\_l}$) in magnitude for the third predetermined period of time, the chip 510 for PWM control enters a power saving mode as shown in Region II. For example, under the power saving mode, some functions of the chip 510 that are unnecessary are powered down in order to reduce the current consumption of the chip 510 for PWM control, thus keeping the chip supply voltage 596 (e.g., $V_{DD}$) from quickly falling below the under-voltage lockout (UVLO) threshold. In another example, if the current consumption of the chip 510 is reduced in Region II, the converter 500 can operate with lower burst duty cycle under burst mode operation and with lower standby power.

In yet another embodiment, if the chip supply voltage 596 (e.g., $V_{DD}$) is determined to be higher than the supply upper threshold (e.g., $V_{DD\_th\_h}$) in magnitude for the fourth predetermined period of time, the chip 510 for PWM control enters a power dissipation mode as shown in Region I. For example, the chip supply voltage 596 (e.g., $V_{DD}$) drifts too high due to low current consumption of the chip 510. In another example, under the power dissipation mode, extra power is dissipated in order to prevent the chip supply voltage 596 (e.g., $V_{DD}$) from damaging the chip 510 for PWM control.

In yet another embodiment, if the chip supply voltage 596 (e.g., $V_{DD}$) neither remains lower than the supply lower threshold (e.g., $V_{DD\_th\_l}$) in magnitude for the third predetermined period of time nor remains higher than the supply upper threshold (e.g., $V_{DD\_th\_h}$) in magnitude for the fourth predetermined period of time, the chip 510 for PWM control enters the normal mode as shown in Region IV. For example, the PWM controller component 520 operates in the normal mode with a relatively low switching frequency. In another example, the drive signal 592 turns on and off the power switch 120 at the switching frequency. In yet another example, all the functions of the chip 510, such as all the protection functions, are active in Region IV.

Returning to FIG. 5, the feedback signal 598 (e.g., $V_{FB}$), the current sensing signal 594 (e.g., $V_{cs}$), and the chip supply voltage 596 (e.g., $V_{DD}$) are received by the management monitoring component 550 according to certain embodiments. For example, the management monitoring component 550 compares the feedback signal 598 (e.g., $V_{FB}$) with the feedback threshold (e.g., $V_{FB\_th}$), the current sensing signal 594 (e.g., $V_{cs}$ that represents the peak magnitude of the current 593) with the current sensing threshold (e.g., $V_{cs\_th}$), and the chip supply voltage 596 (e.g., $V_{DD}$) with both the supply upper threshold (e.g., $V_{DD\_th\_h}$) and the supply lower threshold (e.g., $V_{DD\_th\_l}$). In another example, the management monitoring component 550 generates a monitoring signal 551, which is received by the management control component 552. In yet another example, the management control component 552 in response sends a management control signal 553 to the gate driver 530, the adjustable resistor 554, the oscillator 540, the protection component 542, and the current and voltage generator 544.

Figure 7:
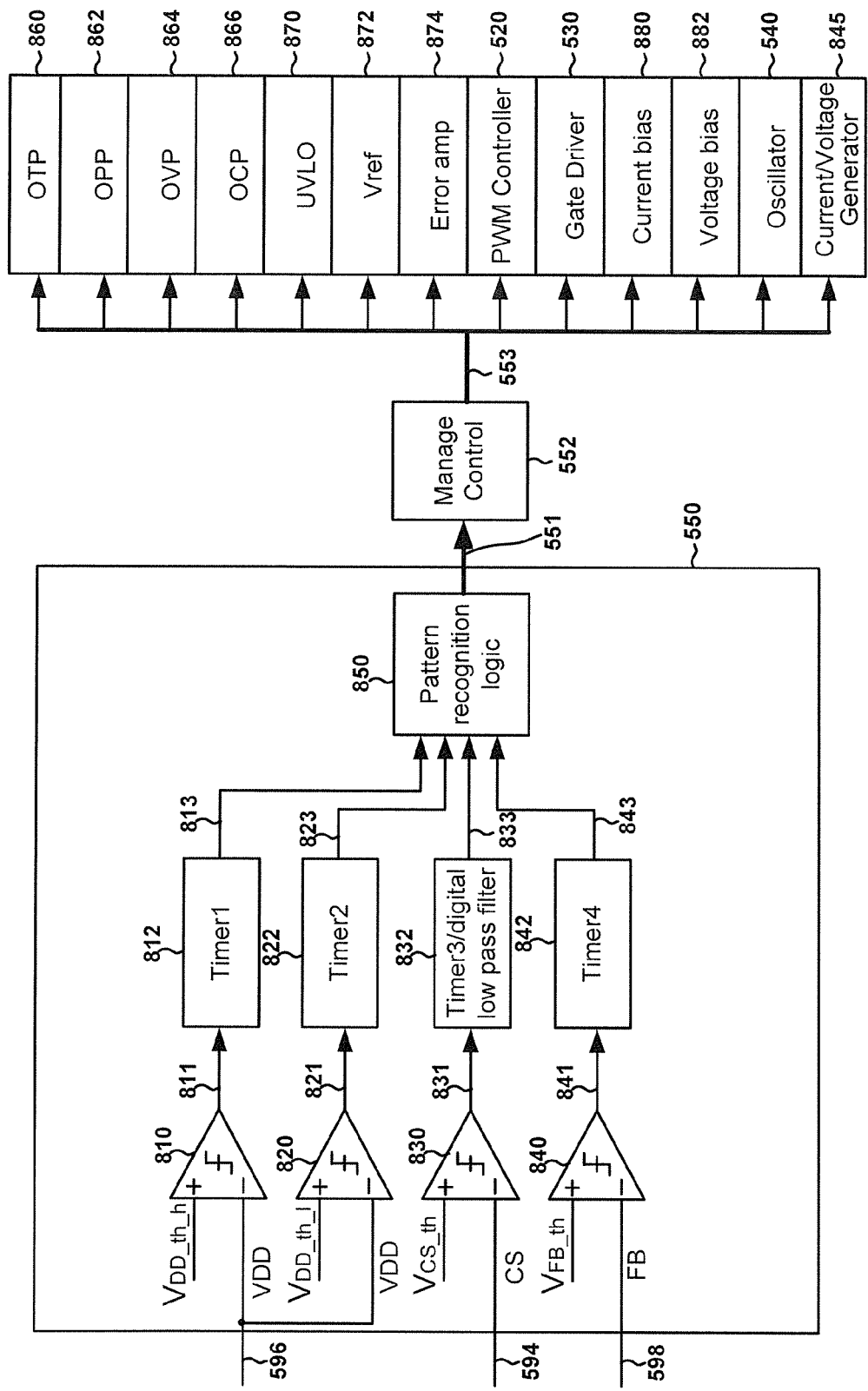
FIG. 7 is a simplified diagram showing the management monitoring component and the management control component of the power converter of FIG. 5 according to an embodiment of the present invention.

According to another embodiment, if the management monitoring component 550 determines that the feedback signal 598 (e.g., $V_{FB}$) is smaller than the feedback threshold (e.g., $V_{FB\_th}$) in magnitude for the first predetermined period of time, the current sensing signal 594 (e.g., $V_{cs}$ that represents the peak magnitude of the current 593) is smaller than the current sensing threshold (e.g., $V_{cs\_th}$) in magnitude for the second predetermined period of time, and the chip supply voltage 596 (e.g., $V_{DD}$) is lower than the supply lower threshold (e.g., $V_{DD\_th\_l}$) in magnitude for the third predetermined period of time, the management monitoring component 550 sends the monitoring signal 551 to the management control component 552 and in response the converter 500 operates in Region II (e.g., as shown in FIG. 6). For example, the management control component 552 generates the management control signal 553, which is received by the gate driver 530, the adjustable resistor 554, the oscillator 540, the protection component 542, and the current and voltage generator 544 to adjust the power consumption or power down some functional blocks (e.g., as shown in FIG. 7). In another example, in Region II, the functional block for over-voltage protection, the functional block for over-temperature protection, the functional block for over-current protection (OCP), and/or the functional block for over-power protection (OPP) are powered down.

According to yet another embodiment, in Region II, the adjustable resistor 554 become larger than in Region III and in Region IV. For example, the adjustable resistor 554 is biased between a reference voltage 555 (e.g., $V_{ref}$) and the feedback signal 598 (e.g., $V_{FB}$), so increasing the resistance value of the resistor 554 can reduce the current consumption of the chip 510 and also reduce the current associated with the photo coupler 578 for loop regulation. In another example, the change in resistance of the resistor 554 does not affect the loop stability even under no load condition.

According to yet another embodiment, if the management monitoring component 550 determines that the feedback signal 598 (e.g., $V_{FB}$) is smaller than the feedback threshold (e.g., $V_{FB\_th}$) in magnitude for the first predetermined period of time, the current sensing signal 594 (e.g., $V_{cs}$ that represents the peak magnitude of the current 593) is smaller than the current sensing threshold (e.g., $V_{cs\_th}$) in magnitude for the second predetermined period of time, and the chip supply voltage 596 (e.g., $V_{DD}$) is higher than the supply upper threshold (e.g., $V_{DD\_th\_h}$) in magnitude for the fourth predetermined period of time, the management monitoring component 550 sends the monitoring signal 551 to the management control component 552 and in response the converter 500 operates in Region I (e.g., as shown in FIG. 6). For example, the management control component 552 generates the management control signal 553, which is received by the gate driver 530, the adjustable resistor 554, the oscillator 540, the protection component 542, and the current and voltage generator 544. In another example, in Region I, the current consumption of the chip 510 is larger than in Region II. In yet another example, an extra current path is provided to discharge the capacitor 150 in order to prevent the chip supply voltage 596 (e.g., $V_{DD}$) from drifting even higher. In yet another example, the converter 500 operates in Region II when the management control signal 553 is at a logic low level (or at a logic high level), and the converter 500 operates in Region IV when the management control signal 553 is at the logic high level (or at the logic low level). In yet another example, the management control signal 553 includes two or more logic control signals, and the converter 500 operates in different Regions (e.g., as shown in FIG. 6) based on the states of the two or more logic control signals.

FIG. 7 is a simplified diagram showing the management monitoring component 550 and the management control component 552 of the power converter 500 according to an embodiment of the present invention. This diagram is merely an example, which should not unduly limit the scope of the claims. One of ordinary skill in the art would recognize many variations, alternatives, and modifications. The management monitoring component 550 includes comparators 810, 820, 830 and 840, timer components 812, 822, 832 and 842, and a pattern recognition logic component 850. For example, the timer component 832 includes a timing functional block and a low-pass filtering functional block.

As shown in FIG. 7, the comparators 810 and 820 each receive the chip supply voltage 596 (e.g., $V_{DD}$), the comparator 830 receives the current sensing signal 594 (e.g., $V_{cs}$), and the comparator 840 receives the feedback signal 598 (e.g., $V_{FB}$), according to one embodiment. For example, the comparator 810 compares the chip supply voltage 596 with the supply upper threshold (e.g., $V_{DD\_th\_h}$) and generates a comparison signal 811. In another example, the comparator 820 compares the chip supply voltage 596 with the supply lower threshold (e.g., $V_{DD\_th\_l}$) and generates a comparison signal 821. In yet another example, the comparator 830 compares the current sensing signal 594 (e.g., $V_{cs}$ that represents the peak magnitude of the current 593) with the current sensing threshold (e.g., $V_{cs\_th}$) and generates a comparison signal 831. In yet another example, the comparator 840 compares the feedback signal 598 (e.g., $V_{FB}$) with the feedback threshold (e.g., $V_{FB\_th}$) and generates a comparison signal 841.

According to another embodiment, the comparator signals 811, 821, 831, and 841 are received by the timer components 812, 822, 832 and 842, respectively. For example, the timer component 812 outputs a signal 813, which indicates whether the chip supply voltage 596 remains larger than the supply upper threshold (e.g., $V_{DD\_th\_h}$) for a predetermined period of time (e.g., $T_1$). In another example, the timer component 822 outputs a signal 823, which indicates whether the chip supply voltage 596 remains smaller than the supply lower threshold (e.g., $V_{DD\_th\_l}$) for a predetermined period of time (e.g., $T_2$). In yet another example, the current sensing signal 594 is a pulse signal, and the timer component 832 performs a low-pass filtering process performs on the comparator signal 831. In yet another example, the timer component 832 outputs a signal 833, which indicates whether the current sensing signal 594 (e.g., $V_{cs}$ that represents the peak magnitude of the current 122) remains smaller than the current sensing threshold (e.g., $V_{cs\_th}$) for a predetermined period of time (e.g., $T_3$). In yet another example, the timer component 842 outputs a signal 843, which indicates whether the feedback signal 598 (e.g., $V_{FB}$) remains smaller than the feedback threshold (e.g., $V_{FB\_th}$) for a predetermined period of time (e.g., $T_4$). In yet another example, each of $T_1$, $T_2$, $T_3$ and $T_4$ is larger than zero in magnitude.

In one embodiment, the timer component 812 is omitted, and the signal 813 is the same as the signal 811. In another embodiment, the timer component 822 is omitted, and the signal 823 is the same as the signal 813. In yet another embodiment, the timing functional block in the timer component 832 is omitted. In yet another embodiment, the timer component 842 is omitted, and the signal 843 is the same as the signal 841.

According to yet another embodiment, the pattern recognition logic component 850 receives the signals 813, 823, 833, and 843, and in response generates the monitoring signal 551, which indicates whether the feedback signal 598 (e.g., $V_{FB}$), the current sensing signal 594 (e.g., $V_{cs}$), and the chip supply voltage 596 (e.g., $V_{DD}$) satisfy the conditions for Region I, Region II, Region III, or Region IV, as shown in FIG. 6.

For example, if the feedback signal 598 (e.g., $V_{FB}$) remains smaller than the feedback threshold (e.g., $V_{FB\_th}$) for the predetermined period of time (e.g., $T_4$), the current sensing signal 594 (e.g., $V_{cs}$ that represents the peak magnitude of the current 122) remains smaller than the current sensing threshold (e.g., $V_{cs\_th}$) for the predetermined period of time (e.g., $T_3$), and the chip supply voltage 596 (e.g., $V_{DD}$) remains larger than the supply upper threshold (e.g., $V_{DD\_th\_h}$) for the predetermined period of time (e.g., $T_1$), the conditions for Region I are satisfied. In another example, if the feedback signal 598 (e.g., $V_{FB}$) remains smaller than the feedback threshold (e.g., $V_{FB\_th}$) for the predetermined period of time (e.g., $T_4$), the current sensing signal 594 (e.g., $V_{cs}$ that represents the peak magnitude of the current 122) remains smaller than the current sensing threshold (e.g., $V_{cs\_th}$) for the predetermined period of time (e.g., $T_3$), and the chip supply voltage 596 (e.g., $V_{DD}$) remains smaller than the supply lower threshold (e.g., $V_{DD\_th\_l}$) for the predetermined period of time (e.g., $T_2$), the conditions for Region II are satisfied.

In yet another example, if the feedback signal 598 (e.g., $V_{FB}$) remains smaller than the feedback threshold (e.g., $V_{FB\_th}$) for the predetermined period of time (e.g., $T_4$), and the current sensing signal 594 (e.g., $V_{cs}$ that represents the peak magnitude of the current 122) remains smaller than the current sensing threshold (e.g., $V_{cs\_th}$) for the predetermined period of time (e.g., $T_3$), but the chip supply voltage 596 (e.g., $V_{DD}$) does not remain larger than the supply upper threshold (e.g., $V_{DD\_th\_h}$) for the predetermined period of time (e.g., $T_1$) and the chip supply voltage 596 (e.g., $V_{DD}$) does not remain smaller than the supply lower threshold (e.g., $V_{DD\_th\_l}$) for the predetermined period of time (e.g., $T_2$), the conditions for Region IV are satisfied. In yet another example, if the feedback signal 598 (e.g., $V_{FB}$) does not remain smaller than the feedback threshold (e.g., $V_{FB\_th}$) for the predetermined period of time (e.g., $T_4$), and the current sensing signal 594 (e.g., $V_{cs}$ that represents the peak magnitude of the current 122) does not remain smaller than the current sensing threshold (e.g., $V_{cs\_th}$) for the predetermined period of time (e.g., $T_3$), the conditions for Region III are satisfied.

As shown in FIG. 7, the management control component 552 receives the monitoring signal 551, and in response generates the management control signal 553. For example, the management control signal 553 is received by a functional block 860 for over-temperature protection (OTP), a functional block 862 for over-power protection (OPP), a functional block 864 for over-voltage protection (OVP), and a functional block 866 for over-current protection (OCP). In another example, the management control signal 553 is also received by a functional block 870 for the under-voltage lockout (UVLO) threshold, and a functional block 872 for reference voltage generation. In yet another example, the management control signal 553 is also received by a functional block 874 for error amplification, the PWM controller 520, the gate driver 530, and the oscillator 540. In yet another example, the management control signal 553 is also received by a functional block 880 for current bias, a functional block 882 for voltage bias, and a functional block 845 for current and voltage generation. In yet another example, the functional block 860 for over-temperature protection, the functional block 862 for over-power protection, the functional block 864 for over-voltage protection, the functional block 866 for over-current protection, and the functional block 870 for the under-voltage lockout threshold are included in the protection component 542. In yet another example, the functional block 872 for reference voltage generation, the functional block 880 for current bias, the functional block 882 for voltage bias, and the functional block 845 for current and voltage generation are included in the current and voltage generator 544. In yet another example, the functional block 874 for error amplification is included in the adjustable resistor 554.

In one embodiment, if the monitoring signal 551 indicates the conditions for Region II are satisfied, the current consumption for the functional block 860, the functional block 862, the functional block 864, the functional block 866, the functional block 870, the functional block 872, an error amplifier 874, the PWM controller 520, the gate driver 530, the oscillator 540, the functional block 880 for current bias, the functional block 882 for voltage bias, and/or the current and voltage generator 544 are reduced in comparison with the current consumption in Region III and/or Region IV. In one embodiment, if the monitoring signal 551 indicates the conditions for Region II are satisfied, the under-voltage lockout (UVLO) threshold is made smaller in magnitude through the functional block 870 in comparison with the under-voltage lockout (UVLO) threshold in Region III.

As discussed above, and further emphasized here, FIG. 5 is merely an example, which should not unduly limit the scope of the claims. One of ordinary skill in the art would recognize many variations, alternatives, and modifications. For example, instead of outputting the feedback signal 598 (e.g., $V_{FB}$) from the collector of the phototransistor 586 as part of the photo coupler 578, a feedback signal (e.g., $V_{FB}$) is outputted from the emitter of a phototransistor as part of a photo coupler as shown in FIG. 8.

Figure 8:
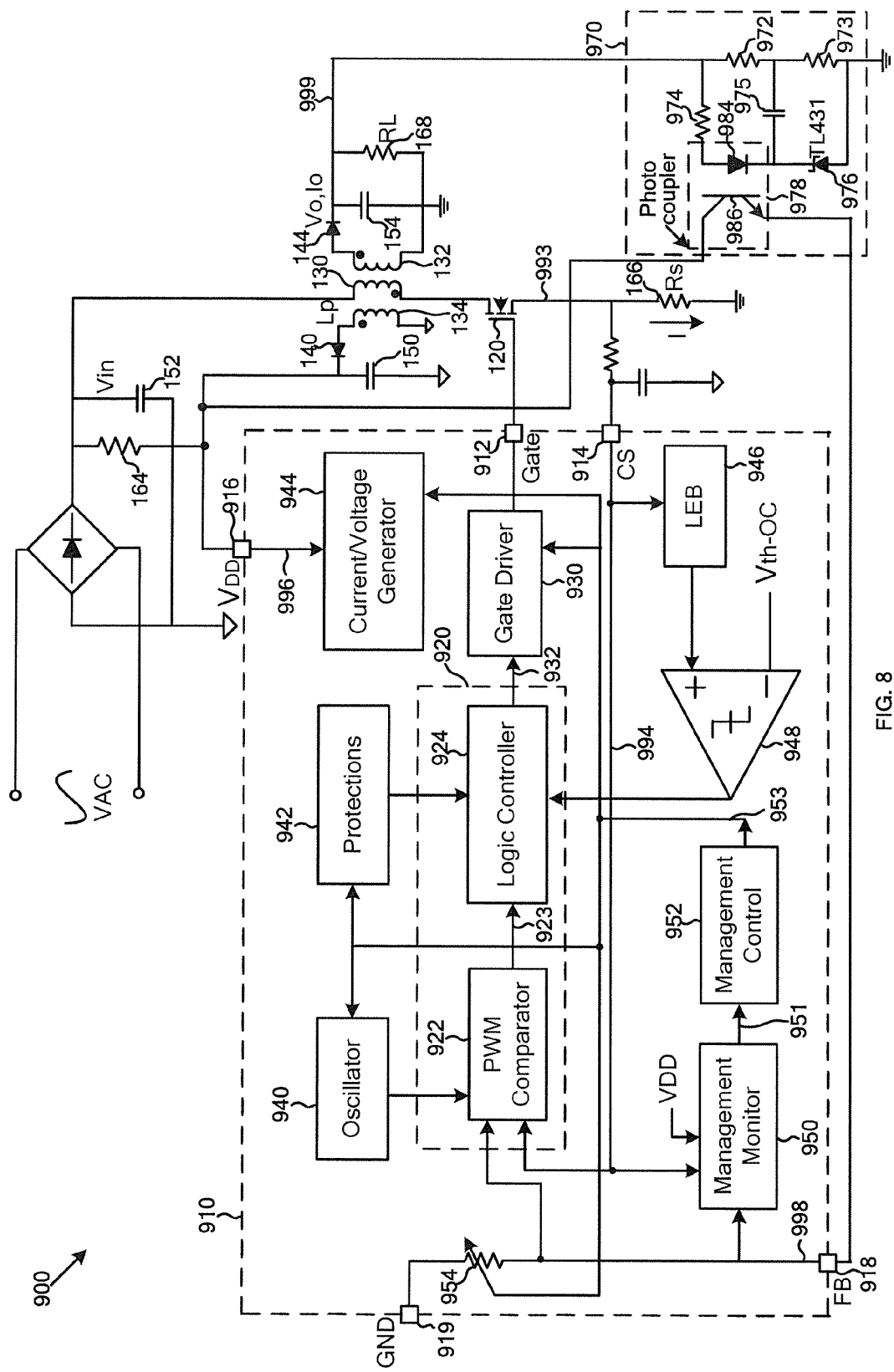
FIG. 8 is a simplified diagram showing a power converter with dynamic management of chip current consumption for PWM control according to another embodiment of the present invention.

FIG. 8 is a simplified diagram showing a power converter with dynamic management of chip current consumption for PWM control according to another embodiment of the present invention. This diagram is merely an example, which should not unduly limit the scope of the claims. One of ordinary skill in the art would recognize many variations, alternatives, and modifications. The converter 900 includes a chip 910 for PWM control, the power switch 120, the primary winding 130, the secondary winding 132, the auxiliary winding 134, the diodes 140 and 144, the capacitors 150, 152 and 154, the resistors 164 and 166, and an isolated feedback component 970.

The chip 910 for PWM control includes a PWM controller component 920, a gate driver 930, an oscillator 940, a protection component 942, a current and voltage generator 944, a leading-edge-blanking component 946, an over-current comparator 948, a management monitoring component 950, a management control component 952, and an adjustable resistor 954. Also, the chip 910 for PWM control includes terminals 912, 914, 916, 918, and 919. Additionally, the PWM controller component 920 includes a PWM comparator 922 and a logic controller 924. Moreover, the isolated feedback component 970 includes resistors 972, 973 and 974, a capacitor 975, an error amplifier 976, and a photo coupler 978 that includes a photodiode 984 and a phototransistor 986.

For example, the PWM controller component 920, the gate driver 930, the oscillator 940, the protection component 942, the current and voltage generator 944, the leading-edge-blanking component 946, and the over-current comparator 948 are the same as the PWM controller component 520, the gate driver 530, the oscillator 540, the protection component 542, the current and voltage generator 544, the leading-edge-blanking component 546, and the over-current comparator 548, respectively.

As shown in FIG. 8, the chip 910 for PWM control is powered by at least the auxiliary winding 134 and the capacitor 150 through the terminal 916 (e.g., $V_{DD}$) according to one embodiment. For example, the capacitor 150 is used to provide a chip supply voltage 996 (e.g., $V_{DD}$) to the chip 910 through the terminal 916. In another example, the output voltage 999 (e.g., $V_o$) of the secondary winding 132 is sensed by the isolated feedback component 970, which generates a feedback signal 998 (e.g., $V_{FB}$) that is received by the adjustable resistor 954. In yet another example, both the PWM comparator 922 and the management monitoring component 950 also receive the feedback signal 998 through the terminal 918. In yet another example, the PWM comparator 922 also receives a current sensing signal 994 and generates a PWM comparator output signal 923. In yet another example, the PWM comparator output signal 923 is received by the logic controller 924, which generates the PWM signal 932 based on at least information associated with the PWM comparator output signal 923. In yet another example, a feedback impedance associated with the terminal 918 (e.g., FB) changes with output load conditions.

In one embodiment, the feedback signal 998 (e.g., $V_{FB}$), the current sensing signal 994 (e.g., $V_{cs}$), and the chip supply voltage 996 (e.g., $V_{DD}$) are received by the management monitoring component 950. For example, the management monitoring component 950 compares the feedback signal 998 (e.g., $V_{FB}$) with a feedback threshold (e.g., $V_{FB\_th}$), the current sensing signal 994 (e.g., $V_{cs}$ that represents a peak magnitude of a current 993 flowing through the primary winding 130) with a current sensing threshold (e.g., $V_{cs\_th}$), and the chip supply voltage 996 (e.g., $V_{DD}$) with both the supply upper threshold (e.g., $v_{DD\_th\_h}$) and the supply upper threshold (e.g., $V_{DD\_th\_h}$). In another example, the management monitoring component 950 generates a monitoring signal 951, which is received by the management control component 952. In yet another example, the management control component 952 in response sends a management control signal 953 to the adjustable resistor 954, the oscillator 940, the protection component 942, and the current and voltage generator 944. In yet another example, the management control signal 953 includes one or more logic control signals.

In another embodiment, if the management monitoring component 950 determines that the feedback signal 998 (e.g., $V_{FB}$) is larger than the feedback threshold (e.g., $V_{FB\_th}$), the current sensing signal 994 (e.g., $V_{cs}$ that represents the peak magnitude of the current 122) is smaller than the current sensing threshold (e.g., $V_{cs\_th}$), and the chip supply voltage 996 (e.g., $V_{DD}$) is lower than the supply lower threshold (e.g., $V_{DD\_th\_l}$), the management monitoring component 950 sends the monitoring signal 951 to the management control component 952 and in response the converter 900 operates in Region II. For example, the management control component 952 generates the management control signal 953, which is received by the gate driver 930, the adjustable resistor 954, the oscillator 940, the protection component 942, and the current and voltage generator 944. In another example, in Region II, certain functional blocks in the chip 910, e.g., a functional block for over-voltage protection, a functional block for over-temperature protection, a functional block for over-current protection, and/or a functional block for over-power protection, are powered down to reduce current consumption of the chip 910.

In yet another embodiment, in Region II, the adjustable resistor 954 become larger than in Region III and in Region IV. For example, the adjustable resistor 954 is biased between a ground voltage level through the terminal 919 (e.g., terminal GND) and the feedback signal 998 (e.g., $V_{FB}$), so increasing the resistance value of the resistor 954 reduces the current consumption of the chip 910. In another example, the change in resistance of the resistor 954 does not affect the loop gain stability even under no load condition. In yet another example, in Region II, the under-voltage lockout (UVLO) threshold is made smaller in magnitude in comparison with the under-voltage lockout (UVLO) threshold in Region III.

According to another embodiment, if the management monitoring component 950 determines that the feedback signal 998 (e.g., $V_{FB}$) is larger than the feedback threshold (e.g., $V_{FB\_th}$), the current sensing signal 594 (e.g., $V_{cs}$ that represents the peak magnitude of the current 993) is smaller than the current sensing threshold (e.g., $V_{cs\_th}$), and the chip supply voltage 596 (e.g., $V_{DD}$) is higher than the supply upper threshold (e.g., $V_{DD\_th\_h}$), the management monitoring component 950 sends the monitoring signal 951 to the management control component 952 and in response the converter 900 operates in Region I. For example, the management control component 952 generates the management control signal 953, which is received by the gate driver 930, the adjustable resistor 954, the oscillator 940, the protection component 942, and the current and voltage generator 944. In another example, in Region I, the current consumption of the chip 910 is larger than in Region II. In yet another example, an extra current path is provided to discharge the capacitor 150 in order to prevent the chip supply voltage 596 (e.g., $V_{DD}$) from drifting even higher. In yet another example, the converter 900 operates in Region II when the management control signal 953 is at a logic low level (or at a logic high level), and the converter 900 operates in Region IV when the management control signal 953 is at the logic high level (or at the logic low level). In yet another example, the management control signal 953 includes two or more logic control signals, and the converter 900 operates in different Regions (e.g., as shown in FIG. 6) based on the status of the two or more logic control signals.

Figure 9:
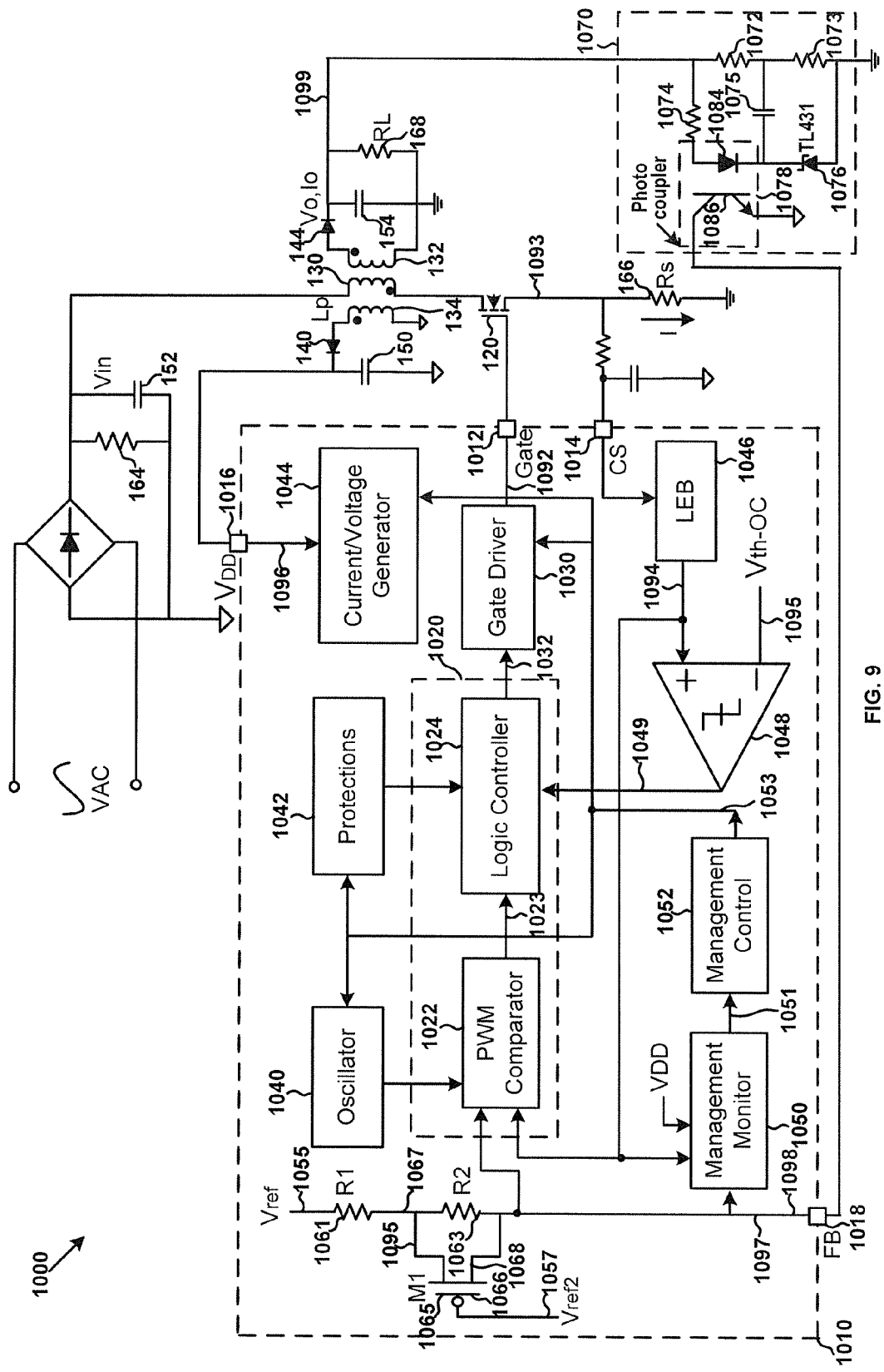
FIG. 9 is a simplified diagram showing a power converter with dynamic management of chip current consumption for PWM control according to yet another embodiment of the present invention.

FIG. 9 is a simplified diagram showing a power converter with dynamic management of chip current consumption for PWM control according to yet another embodiment of the present invention. This diagram is merely an example, which should not unduly limit the scope of the claims. One of ordinary skill in the art would recognize many variations, alternatives, and modifications.

The converter 1000 includes a chip 1010 for PWM control, the power switch 120, the primary winding 130, the secondary winding 132, the auxiliary winding 134, the diodes 140 and 144, the capacitors 150, 152 and 154, the resistors 164 and 166, and an isolated feedback component 1070. The chip 1010 for PWM control includes a PWM controller component 1020, a gate driver 1030, an oscillator 1040, a protection component 1042, a current and voltage generator 1044, a leading-edge-blanking component 1046, an over-current comparator 1048, a management monitoring component 1050, a management control component 1052, resistors 1061 and 1063, and a transistor 1065. Also, the chip 1010 for PWM control includes terminals 1012, 1014, 1016, and 1018. For example, the PWM controller component 1020 includes a PWM comparator 1022 and a logic controller 1024. In another example, the isolated feedback component 1070 includes resistors 1072, 1073 and 1074, a capacitor 1075, an error amplifier 1076, and a photo coupler 1078 that includes a photodiode 1084 and a phototransistor 1086.

In one embodiment, the PWM controller component 1020, the gate driver 1030, the oscillator 1040, the protection component 1042, the current and voltage generator 1044, the leading-edge-blanking component 1046, the over-current comparator 1048, and the isolated feedback component 1070 are the same as the PWM controller component 520, the gate driver 530, the oscillator 540, the protection component 542, the current and voltage generator 544, the leading-edge-blanking component 546, the over-current comparator 548, and the isolated feedback component 570 respectively. For example, the converter 1000 provides an output voltage 1099 (e.g., $V_o$) and an output current (e.g., $I_o$) to the output load 168, such as the output resistor.

As shown in FIG. 9, the PWM controller component 1020 generates a PWM signal 1032, which is received by the gate driver 1030 according to one embodiment. For example, the gate driver 1030, in response, sends a gate signal 1092 to the power switch 120 through the terminal 1012 (e.g., terminal Gate). In another example, in response, the power switch 120 adjusts a current 1093 flowing through the primary winding 130. In yet another example, the current 1093 is sensed by the resistor 166 and converted into a current sensing signal 1094 (e.g., $V_{cs}$) through the terminal 1014 (e.g., terminal CS) and the leading-edge-blanking component 1046. In yet another example, the current sensing signal 1094 is received by the OCP comparator 1048 and compared with an over-current threshold signal 1095 (e.g., $V_{th_{oc}}$). In response, the OCP comparator 1048 sends an over-current control signal 1049 to the logic controller 1024 according to certain embodiments.

According to another embodiment, the chip 1010 for PWM control is powered by at least the auxiliary winding 134 and the capacitor 150 through the terminal 1016 (e.g., terminal $V_{DD}$). For example, the capacitor 150 is used to provide a chip supply voltage 1096 (e.g., $V_{DD}$) to the chip 1010 through the terminal 1016. In another example, the output voltage 1099 (e.g., $V_o$) of the secondary winding 132 is sensed by the isolated feedback component 1070. In yet another example, the isolated feedback component 1070 outputs a feedback signal 1098 (e.g., $V_{FB}$) to the chip 1010 through the terminal 1018 (e.g., terminal FB). In yet another example, the PWM comparator 1022 receives the feedback signal 1098 and the current sensing signal 1094, and generates a PWM comparator output signal 1023. In yet another example, the PWM comparator output signal 1023 is received by the logic controller 1024, which generates the PWM signal 1032 based on at least information associated with the PWM comparator output signal 1023. In yet another example, a feedback impedance associated with the terminal 1018 (e.g., FB) changes with output load conditions.

As shown in FIG. 9, the resistor 1061 receives a reference signal 1055 (e.g., $V_{ref}$) at one terminal and the other terminal of the resistor 1061 is connected to the source terminal 1095 of the transistor 1065 according to certain embodiments. For example, the transistor 1065 is a P-channel field effect transistor. In another example, the transistor 1065 receives a reference signal 1057 (e.g., $V_{ref2}$) at a gate terminal 1066 and the feedback signal 1098 at a drain terminal 1068. In yet another example, a source terminal 1095 of the transistor 1065 is connected to one terminal of the resistor 1063, and the drain terminal 1068 is connected to the other terminal of the resistor 1063. In yet another example, the reference signal 1055 (e.g., $V_{ref}$) is larger than the reference signal 1057 (e.g., $V_{ref2}$) in magnitude.

According to yet another embodiment, under light load or no load conditions, the feedback signal 1098 has a low magnitude and in turn a voltage 1067 of the source terminal 1095 has a low magnitude. For example, if the voltage 1067 of the source terminal 1095 is lower than the reference signal 1057 in magnitude, an on-resistance of the transistor 1065 is large, and there is no current or a limited amount of current flowing through the transistor 1065. Thus, an impedance at the terminal 1018 is approximately equal to a sum of the resistance of the resistor 1061 and the resistor 1063 according to certain embodiments. For example, a feedback current 1097 that flows out of the terminal 1018 can be determined according to the following equation:

$$I_{FB} = \frac{V_{ref} - V_{FB}}{R_1 + R_2} \quad \text{(Equation 2)}$$

where $I_{FB}$ represents the feedback current 1097, $V_{ref}$ represents a reference signal 1055 received at the resistor 1061, and $V_{FB}$ represents the feedback signal 1098. Additionally, $R_1$ represents the resistance of the resistor 1061, and $R_2$ represents the resistance of the resistor 1063. As an example, the feedback current 1097 decreases as the resistance of the resistor 1063 decreases. As another example, the feedback current 1097 has a low magnitude under light load or no load conditions. In yet another example, if the converter 1000 enters a burst mode under light load or no load conditions, the current consumption of the chip 1010 is greatly reduced during a burst-off period (e.g., when the feedback signal 1098 is less than the particular threshold in magnitude). Hence the power consumption of the chip 1010 in the burst mode is greatly reduced according to certain embodiments.

In one embodiment, if the output load changes from the light load or no load to a full load, the feedback signal 1098 increases in magnitude and in turn the voltage 1067 of the source terminal 1095 increases in magnitude. For example, if the voltage 1067 of the source terminal 1095 is larger, in magnitude, than the reference signal 1057 plus a turn-on threshold, the on-resistance of the transistor 1065 decreases and a current 1095 flows through the transistor 1065. In another example, the impedance at the terminal 1018 can be determined according to the following equation:

$$R_{FB} = R_1 + \frac{R_2 \times R_{on}}{R_2 + R_{on}} \quad \text{(Equation 3)}$$

where $R_{FB}$ represents the impedance at the terminal 1018, $R_1$ represents the resistance of the resistor 1061, $R_2$ represents the resistance of the resistor 1063, and $R_{on}$ represents the on-resistance of the transistor 1065. In yet another example, the transistor 1065 has a low on-resistance under the full-load condition, and the impedance at the terminal 1018 is approximately equal to the resistance of the resistor 1061. The change in the impedance at the terminal 1018 under different load conditions does not affect the loop stability according to some embodiments.

As shown in FIG. 9, the feedback signal 1098 (e.g., $V_{FB}$), the current sensing signal 1094 (e.g., $V_{cs}$), and the chip supply voltage 1096 are received by the management monitoring component 1050 according to certain embodiments. For example, the management monitoring component 1050 compares the feedback signal 1098 with the feedback threshold (e.g., $V_{FB\_th}$), the current sensing signal 1094 (e.g., $V_{cs}$ that represents the peak magnitude of the current 1093) with the current sensing threshold (e.g., $V_{cs\_th}$), and the chip supply voltage 1096 (e.g., $V_{DD}$) with both the supply upper threshold (e.g., $V_{DD\_th\_h}$) and the supply lower threshold (e.g., $V_{DD\_th\_l}$). In another example, the management monitoring component 1050 generates a monitoring signal 1051, which is received by the management control component 1052. In yet another example, the management control component 1052 in response sends a management control signal 1053 to the gate driver 1030, the oscillator 1040, the protection component 1042, and the current and voltage generator 1044. In yet another example, the management control signal 1053 includes one or more logic control signals.

According to another embodiment, if the management monitoring component 1050 determines that the feedback signal 1098 (e.g., $V_{FB}$) is smaller than the feedback threshold (e.g., $V_{FB\_th}$), the current sensing signal 1094 (e.g., $V_{cs}$ that represents the peak magnitude of the current 1093) is smaller than the current sensing threshold (e.g., $V_{cs\_th}$), and the chip supply voltage 1096 (e.g., $V_{DD}$) is lower than the supply lower threshold (e.g., $V_{DD\_th\_l}$), the management monitoring component 1050 sends the monitoring signal 1051 to the management control component 1052 and in response the converter 1000 operates in Region II (e.g., as shown in FIG. 6). For example, the management control component 1052 generates the management control signal 1053, which is received by the gate driver 1030, the oscillator 1040, the protection component 1042, and the current and voltage generator 1044 to adjust the power consumption or power down some functional blocks. In another example, in Region II, the functional block for over-voltage protection, the functional block for over-temperature protection, the functional block for over-current protection, and/or the functional block for over-power protection are powered down.

According to yet another embodiment, if the management monitoring component 1050 determines that the feedback signal 1098 (e.g., $V_{FB}$) is smaller than the feedback threshold (e.g., $V_{FB\_th}$), the current sensing signal 1094 (e.g., $V_{cs}$ that represents the peak magnitude of the current 1093) is smaller than the current sensing threshold (e.g., $V_{cs\_th}$), and the chip supply voltage 1096 (e.g., $V_{DD}$) is higher than the supply upper threshold (e.g., $V_{DD\_th\_h}$), the management monitoring component 1050 sends the monitoring signal 1051 to the management control component 1052 and in response the converter 1000 operates in Region I (e.g., as shown in FIG. 6). For example, in Region I, the current consumption of the chip 1010 is larger than in Region II. In yet another example, an extra current path is provided to discharge the capacitor 150 in order to prevent the chip supply voltage 1096 (e.g., $V_{DD}$) from drifting even higher. In yet another example, the converter 1000 operates in Region II when the management control signal 1053 is at a logic low level (or at a logic high level), and the converter 1000 operates in Region IV when the management control signal 1053 is at the logic high level (or at the logic low level). In yet another example, the management control signal 1053 includes two or more logic control signals, and the converter 1000 operates in different Regions (e.g., as shown in FIG. 6) based on the states of the two or more logic control signals.

As discussed above, and further emphasized here, FIG. 9 is merely an example, which should not unduly limit the scope of the claims. One of ordinary skill in the art would recognize many variations, alternatives, and modifications. For example, instead of outputting the feedback signal 1098 (e.g., $V_{FB}$) from the collector of the phototransistor 1086 as part of the photo coupler 1078, a feedback signal (e.g., $V_{FB}$) is outputted from the emitter of the phototransistor 1086. In another example, instead of applying the reference signal 1057 on the gate terminal of the transistor 1065, a management control signal generated from a management control component is applied on the gate terminal of the transistor as shown in FIG. 10.

Figure 10:
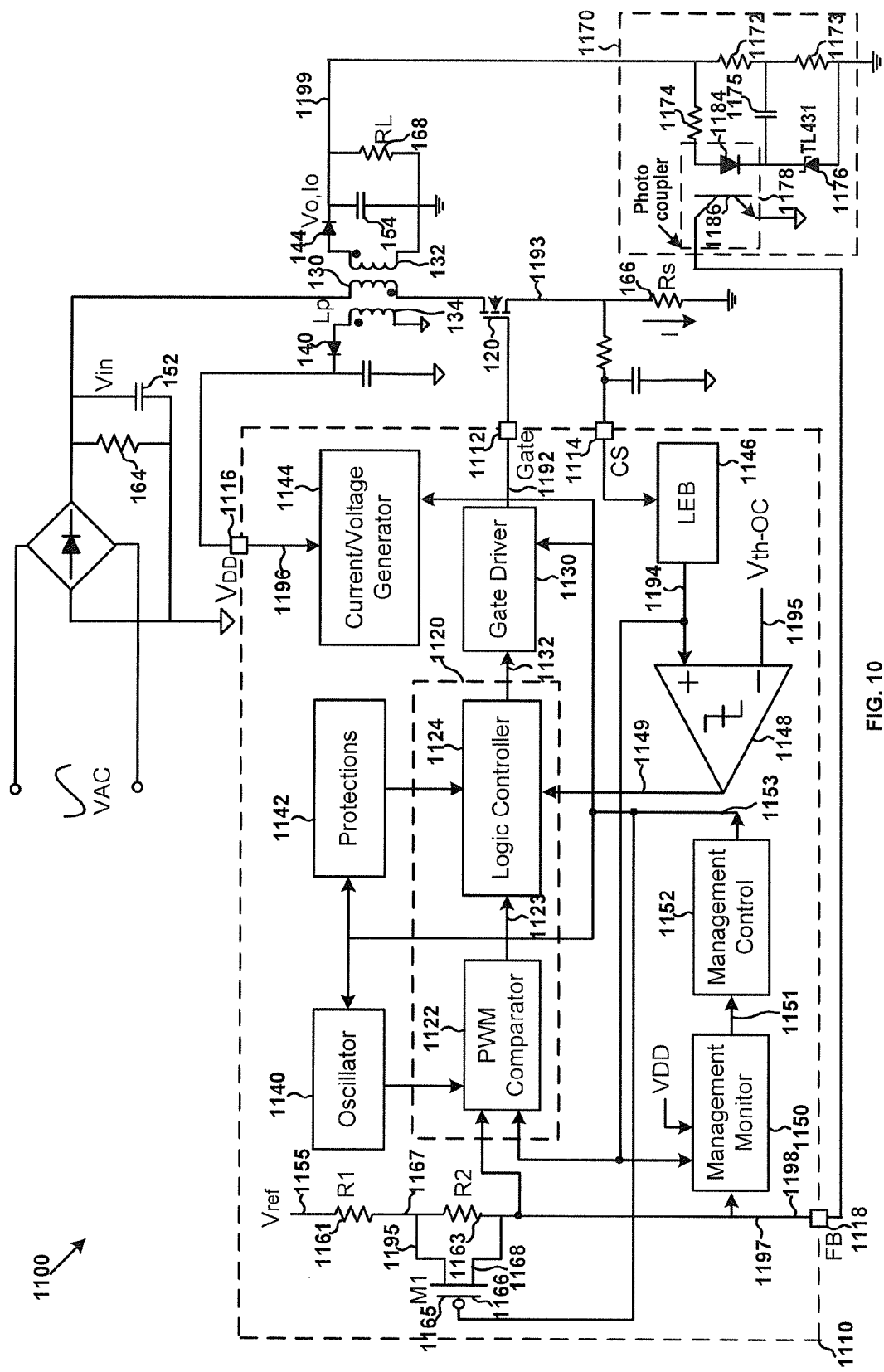
FIG. 10 is a simplified diagram showing a power converter with dynamic management of chip current consumption for PWM control according to yet another embodiment of the present invention.

FIG. 10 is a simplified diagram showing a power converter with dynamic management of chip current consumption for PWM control according to yet another embodiment of the present invention. This diagram is merely an example, which should not unduly limit the scope of the claims. One of ordinary skill in the art would recognize many variations, alternatives, and modifications.

The converter 1100 includes a chip 1110 for PWM control, the power switch 120, the primary winding 130, the secondary winding 132, the auxiliary winding 134, the diodes 140 and 144, the capacitors 150, 152 and 154, the resistors 164 and 166, and an isolated feedback component 1170. The chip 1110 for PWM control includes a PWM controller component 1120, a gate driver 1130, an oscillator 1140, a protection component 1142, a current and voltage generator 1144, a leading-edge-blanking component 1146, an over-current comparator 1148, a management monitoring component 1150, a management control component 1152, resistors 1161 and 1163, and a transistor 1165. Also, the chip 1110 for PWM control includes terminals 1112, 1114, 1116, and 1118. For example, the PWM controller component 1120 includes a PWM comparator 1122 and a logic controller 1124. In another example, the isolated feedback component 1170 includes resistors 1172, 1173 and 1174, a capacitor 1175, an error amplifier 1176, and a photo coupler 1178 that includes a photodiode 1184 and a phototransistor 1186.

In one embodiment, the PWM controller component 1120, the gate driver 1130, the oscillator 1140, the protection component 1142, the current and voltage generator 1144, the leading-edge-blanking component 1146, the over-current comparator 1148, and the isolated feedback component 1170 are the same as the PWM controller component 520, the gate driver 530, the oscillator 540, the protection component 542, the current and voltage generator 544, the leading-edge-blanking component 546, the over-current comparator 548, and the isolated feedback component 570 respectively. For example, the converter 1100 provides an output voltage 1199 (e.g., $V_o$) and an output current (e.g., $I_o$) to the output load 168, such as the output resistor.

As shown in FIG. 10, the PWM controller component 1120 generates a PWM signal 1132, which is received by the gate driver 1130 according to one embodiment. For example, the gate driver 1130, in response, sends a gate signal 1192 to the power switch 120 through the terminal 1112 (e.g., terminal Gate). In another example, in response, the power switch 120 adjusts a current 1193 flowing through the primary winding 130. In yet another example, the current 1193 is sensed by the resistor 166 and converted into a current sensing signal 1194 (e.g., $V_{cs}$) through the terminal 1114 (e.g., terminal CS) and the leading-edge-blanking component 1146. In yet another example, the current sensing signal 1194 is received by the OCP comparator 1148 and compared with an over-current threshold signal 1195 (e.g., $V_{th\_oc}$). In response, the OCP comparator 1148 sends an over-current control signal 1149 to the logic controller 1124 according to certain embodiments.

According to another embodiment, the chip 1110 for PWM control is powered by at least the auxiliary winding 134 and the capacitor 150 through the terminal 1116 (e.g., terminal $V_{DD}$). For example, the capacitor 150 is used to provide a chip supply voltage 1196 (e.g., $V_{DD}$) to the chip 1110 through the terminal 1116. In another example, the output voltage 1199 (e.g., $V_o$) of the secondary winding 132 is sensed by the isolated feedback component 1170. In yet another example, the isolated feedback component 1170 outputs a feedback signal 1198 (e.g., $V_{FB}$) to the chip 1110 through the terminal 1118 (e.g., terminal FB). In yet another example, the PWM comparator 1122 receives the feedback signal 1198 and the current sensing signal 1194, and generates a PWM comparator output signal 1123. In yet another example, the PWM comparator output signal 1123 is received by the logic controller 1124, which generates the PWM signal 1132 based on at least information associated with the PWM comparator output signal 1123. In yet another example, a feedback impedance associated with the terminal 1118 (e.g., FB) changes with output load conditions.

According to yet another embodiment, the feedback signal 1198 (e.g., $V_{FB}$), the current sensing signal 1194 (e.g., $V_{cs}$), and the chip supply voltage 1196 are received by the management monitoring component 1150. For example, the management monitoring component 1150 compares the feedback signal 1198 with the feedback threshold (e.g., $V_{FB\_th}$), the current sensing signal 1194 (e.g., $V_{cs}$ that represents the peak magnitude of the current 1193) with the current sensing threshold (e.g., $V_{cs\_th}$), and the chip supply voltage 1196 (e.g., $V_{DD}$) with both the supply upper threshold (e.g., $V_{DD\_th\_h}$) and the supply lower threshold (e.g., $V_{DD\_th\_l}$). In another example, the management monitoring component 1150 generates a monitoring signal 1151, which is received by the management control component 1152. In yet another example, the management control component 1152 in response sends a management control signal 1153 to the gate driver 1130, the oscillator 1140, the protection component 1142, and the current and voltage generator 1144. In yet another example, the management control signal 1153 includes one or more logic control signals.

As shown in FIG. 10, the resistor 1161 receives a reference signal 1155 (e.g., $V_{ref}$) at one terminal and the other terminal of the resistor 1161 is connected to the source terminal 1195 of the transistor 1165 according to certain embodiments. For example, the transistor 1165 is a P-channel field effect transistor. In another example, the transistor 1165 receives the management control signal 1153 at a gate terminal 1166 and the feedback signal 1198 at a drain terminal 1168. In yet another example, a source terminal 1195 of the transistor 1165 is connected to one terminal of the resistor 1163, and the drain terminal 1168 is connected to the other terminal of the resistor 1163.

In one embodiment, under light load or no load conditions, the feedback signal 1198 has a low magnitude and in turn a voltage 1167 of the source terminal 1195 has a low magnitude. For example, if the voltage 1167 is lower than the management control signal 1153 in magnitude, an on-resistance of the transistor 1165 is large, and there is no current or a limited amount of current flowing through the transistor 1165. Thus, an impedance at the terminal 1018 is approximately equal to a sum of the resistance of the resistor 1161 and the resistor 1163 according to certain embodiments. For example, a feedback current 1197 that flows out of the terminal 1118 can be determined according to the following equation:

$$I_{FB} = \frac{V_{ref} - V_{FB}}{R_1 + R_2} \quad \text{(Equation 4)}$$

where $I_{FB}$ represents the feedback current 1197, $V_{ref}$ represents a reference signal 1155 received at the resistor 1161, and $V_{FB}$ represents the feedback signal 1198. Additionally, $R_1$ represents the resistance of the resistor 1161, and $R_2$ represents the resistance of the resistor 1163. In another example, the feedback current 1197 decreases as the resistance of the resistor 1163 decreases. In yet another example, the feedback current 1197 has a low magnitude under light load or no load conditions. In yet another example, if the converter 1100 enters a burst mode under light load or no load conditions, the current consumption of the chip 1110 is greatly reduced during a burst-off period (e.g., when the feedback signal 1198 is less than the lower threshold in magnitude). Hence the power consumption of the chip 1110 in the burst mode is greatly reduced according to certain embodiments.

In another embodiment, if the output load changes from the light load or no load to a full load, the feedback signal 1198 increases and in turn the voltage 1167 of the source terminal 1195 increases. For example, if the voltage 1167 of the source terminal 1195 is larger, in magnitude, than the management control signal 1153 plus a turn-on threshold, the impedance at the terminal 1118 can be determined according to the following equation when the transistor 1165 is turned on:

$$R_{FB} = R_1 + \frac{R_2 \times R_{on}}{R_2 + R_{on}} \quad \text{(Equation 5)}$$

where $R_{FB}$ represents the impedance at the terminal 1118, $R_1$ represents the resistance of the resistor 1161, $R_2$ represents the resistance of the resistor 1163, and $R_{on}$ represents the on-resistance of the transistor 1165. As an example, the transistor 1165 has a low on-resistance under the full-load condition, and the impedance at the terminal 1118 is approximately equal to the resistance of the resistor 1161. The change in the impedance at the terminal 1118 under different load conditions does not affect the loop stability according to some embodiments.

In another embodiment, if the management monitoring component 1150 determines that the feedback signal 1198 (e.g., $V_{FB}$) is smaller than a feedback threshold (e.g., $V_{FB\_th}$), the current sensing signal 1194 (e.g., $V_{cs}$ that represents the peak magnitude of the current 1193) is smaller than a current sensing threshold (e.g., $V_{cs\_th}$), and the chip supply voltage 1196 (e.g., $V_{DD}$) is lower than a supply lower threshold (e.g., $V_{DD\_th\_l}$), the management monitoring component 1150 sends the monitoring signal 1151 to the management control component 1152 and in response the converter 1100 operates in Region II (e.g., as shown in FIG. 6). For example, the management control component 1152 generates the management control signal 1153, which is received by the gate driver 1130, the oscillator 1140, the protection component 1142, and the current and voltage generator 1144 to adjust the power consumption or power down some functional blocks. In another example, in Region II, the functional block for over-voltage protection, the functional block for over-temperature protection, the functional block for over-current protection, and/or the functional block for over-power protection are powered down.

In yet another embodiment, if the management monitoring component 1150 determines that the feedback signal 1198 (e.g., $V_{FB}$) is smaller than the feedback threshold (e.g., $V_{FB\_th}$), the current sensing signal 1194 (e.g., $V_{cs}$ that represents the peak magnitude of the current 1193) is smaller than the current sensing threshold (e.g., $V_{cs\_th}$), and the chip supply voltage 1196 (e.g., $V_{DD}$) is higher than the supply upper threshold (e.g., $V_{DD\_th\_h}$), the management monitoring component 1150 sends the monitoring signal 1151 to the management control component 1152 and in response the converter 1100 operates in Region I (e.g., as shown in FIG. 6). For example, in Region I, the current consumption of the chip 1110 is larger than in Region II. In yet another example, an extra current path is provided to discharge the capacitor 150 in order to prevent the chip supply voltage 1196 (e.g., $V_{DD}$) from drifting even higher. In yet another example, the converter 1100 operates in Region II when the management control signal 1153 is at a logic low level (or at a logic high level), and the converter 1100 operates in Region IV when the management control signal 1153 is at the logic high level (or at the logic low level). In yet another example, the management control signal 1153 includes two or more logic control signals, and the converter 1100 operates in different Regions (e.g., as shown in FIG. 6) based on the states of the two or more logic control signals.

As discussed above, and further emphasized here, FIG. 10 is merely an example, which should not unduly limit the scope of the claims. One of ordinary skill in the art would recognize many variations, alternatives, and modifications. For example, instead of connecting the transistor 1165 in parallel with the resistor 1163 to adjust the impedance at the terminal 1118, the feedback impedance is adjusted using a different scheme as shown in FIG. 11.

Figure 11:
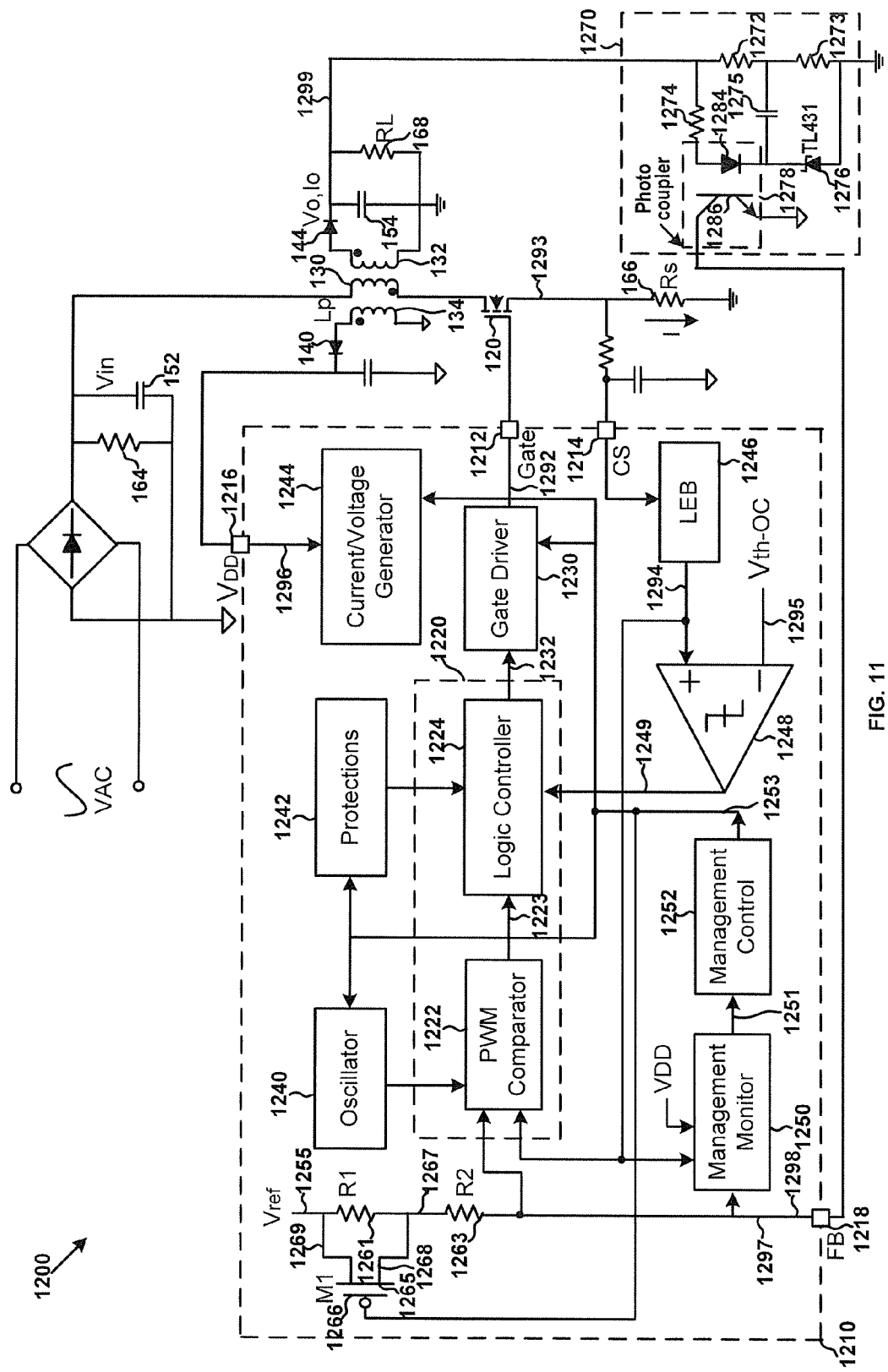
FIG. 11 is a simplified diagram showing a power converter with dynamic management of chip current consumption for PWM control according to yet another embodiment of the present invention.

FIG. 11 is a simplified diagram showing a power converter with dynamic management of chip current consumption for PWM control according to yet another embodiment of the present invention. This diagram is merely an example, which should not unduly limit the scope of the claims. One of ordinary skill in the art would recognize many variations, alternatives, and modifications.

The converter 1200 includes a chip 1210 for PWM control, the power switch 120, the primary winding 130, the secondary winding 132, the auxiliary winding 134, the diodes 140 and 144, the capacitors 150, 152 and 154, the resistors 164 and 166, and an isolated feedback component 1270. The chip 1210 for PWM control includes a PWM controller component 1220, a gate driver 1230, an oscillator 1240, a protection component 1242, a current and voltage generator 1244, a leading-edge-blanking component 1246, an over-current comparator 1248, a management monitoring component 1250, a management control component 1252, resistors 1261 and 1263, and a transistor 1265. Also, the chip 1210 for PWM control includes terminals 1212, 1214, 1216, and 1218. For example, the PWM controller component 1220 includes a PWM comparator 1222 and a logic controller 1224. In another example, the isolated feedback component 1270 includes resistors 1272, 1273 and 1274, a capacitor 1275, an error amplifier 1276, and a photo coupler 1278 that includes a photodiode 1284 and a phototransistor 1286.

In one embodiment, the PWM controller component 1220, the gate driver 1230, the oscillator 1240, the protection component 1242, the current and voltage generator 1244, the leading-edge-blanking component 1246, the over-current comparator 1248, and the isolated feedback component 1270 are the same as the PWM controller component 520, the gate driver 530, the oscillator 540, the protection component 542, the current and voltage generator 544, the leading-edge-blanking component 546, and the over-current comparator 548, and the isolated feedback component 570 respectively. For example, the converter 1200 provides an output voltage 1299 (e.g., $V_o$) and an output current (e.g., $I_o$) to the output load 168, such as the output resistor.

As shown in FIG. 11, the PWM controller component 1220 generates a PWM signal 1232, which is received by the gate driver 1230 according to one embodiment. For example, the gate driver 1230, in response, sends a gate signal 1292 to the power switch 120 through the terminal 1212 (e.g., terminal Gate). In another example, in response, the power switch 120 adjusts a current 1293 flowing through the primary winding 130. In yet another example, the current 1293 is sensed by the resistor 166 and converted into a current sensing signal 1294 (e.g., $V_{cs}$) through the terminal 1214 (e.g., terminal CS) and the leading-edge-blanking component 1246. In yet another example, the current sensing signal 1294 is received by the OCP comparator 1248 and compared with an over-current threshold signal 1295 (e.g., $V_{th\_oc}$). In response, the OCP comparator 1248 sends an over-current control signal 1249 to the logic controller 1224 according to certain embodiments.

According to another embodiment, the chip 1210 for PWM control is powered by at least the auxiliary winding 134 and the capacitor 150 through the terminal 1216 (e.g., terminal $V_{DD}$). For example, the capacitor 150 is used to provide a chip supply voltage 1296 (e.g., $V_{DD}$) to the chip 1210 through the terminal 1216. In another example, the output voltage 1299 (e.g., $V_o$) of the secondary winding 132 is sensed by the isolated feedback component 1270. In yet another example, the isolated feedback component 1270 outputs a feedback signal 1298 (e.g., $V_{FB}$) to the chip 1210 through the terminal 1218 (e.g., terminal FB). In yet another example, the PWM comparator 1222 receives the feedback signal 1298 and the current sensing signal 1294, and generates a PWM comparator output signal 1223. In yet another example, the PWM comparator output signal 1223 is received by the logic controller 1224, which generates the PWM signal 1232 based on at least information associated with the PWM comparator output signal 1223. In yet another example, a feedback impedance associated with the terminal 1218 (e.g., FB) changes with output load conditions.

According to yet another embodiment, the feedback signal 1298 (e.g., $V_{FB}$), the current sensing signal 1294 (e.g., $V_{cs}$), and the chip supply voltage 1296 are received by the management monitoring component 1250. For example, the management monitoring component 1250 compares the feedback signal 1298 with the feedback threshold (e.g., $V_{FB\_th}$), the current sensing signal 1294 (e.g., $V_{cs}$ that represents the peak magnitude of the current 1293) with the current sensing threshold (e.g., $V_{cs\_th}$), and the chip supply voltage 1296 (e.g., $V_{DD}$) with both the supply upper threshold (e.g., $V_{DD\_th\_h}$) and the supply lower threshold (e.g., $V_{DD\_th\_l}$). In another example, the management monitoring component 1250 generates a monitoring signal 1251, which is received by the management control component 1252. In yet another example, the management control component 1252 in response sends a management control signal 1253 to the gate driver 1230, the oscillator 1240, the protection component 1242, and the current and voltage generator 1244. In yet another example, the management control signal 1253 includes one or more logic control signals.

As shown in FIG. 11, the transistor 1265 (e.g., a P-channel field effect transistor) receives a reference signal 1255 (e.g., $V_{ref}$) at a source terminal 1269 and the management control signal 1253 at a gate terminal 1266 according to certain embodiments. For example, one terminal of the resistor 1261 is connected to the source terminal 1269 of the transistor 1265, and the other terminal of the resistor 1261 is connected to the drain terminal 1268 of the transistor 1265. In another example, the drain terminal 1268 is connected to the resistor 1263. In yet another example, the resistor 1263 receives the feedback signal 1298.

In one embodiment, under light load or no load conditions, the feedback signal 1298 has a low magnitude and in turn a voltage 1267 of the drain terminal 1268 has a low magnitude. For example, if the management control signal 1253 is larger than the reference signal 1255 (e.g., $V_{ref}$) in magnitude, an on-resistance of the transistor 1265 is large, and there is no current or a limited amount of current flowing through the transistor 1265. Thus, an impedance at the terminal 1218 is approximately equal to a sum of the resistance of the resistor 1261 and the resistor 1263 according to certain embodiments. For example, a feedback current 1297 that flows out of the terminal 1218 can be determined according to the following equation:

$$I_{FB} = \frac{V_{ref} - V_{FB}}{R_1 + R_2} \qquad \text{(Equation 6)}$$

where $I_{FB}$ represents the feedback current 1297, $V_{ref}$ represents a reference signal 1255 received at the resistor 1261, and $V_{FB}$ represents the feedback signal 1298. Additionally, $R_1$ represents the resistance of the resistor 1261, and $R_2$ represents the resistance of the resistor 1263. In another example, the feedback current 1297 decreases as the resistance of the resistor 1263 decreases. In yet another example, the feedback current 1297 has a low magnitude under light load or no load conditions. In yet another example, if the converter 1200 enters a burst mode under light load or no load conditions, the current consumption of the chip 1210 is greatly reduced during a burst-off period (e.g., when the feedback signal 1298 is less than the lower threshold in magnitude). Hence the power consumption of the chip 1210 in the burst mode is greatly reduced according to certain embodiments.

In another embodiment, if the output load changes from the light load or no load to a full load, the feedback signal 1298 increases and in turn the voltage 1267 of the drain terminal 1268 increases. For example, if the reference signal 1255 (e.g., $V_{ref}$) is larger, in magnitude, than the management control signal 1253 plus a turn-on threshold, the impedance at the terminal 1218 can be determined according to the following equation when the transistor 1265 is turned on:

$$R_{FB} = R_1 + \frac{R_2 \times R_{on}}{R_2 + R_{on}} \qquad \text{(Equation 7)}$$

where $R_{FB}$ represents the impedance at the terminal 1218, $R_1$ represents the resistance of the resistor 1261, $R_2$ represents the resistance of the resistor 1263, and $R_{on}$ represents the on-resistance of the transistor 1265. As an example, the transistor 1265 has a low on-resistance under the full-load condition, and the impedance at the terminal 1218 is approximately equal to the resistance of the resistor 1263. The change in the impedance at the terminal 1218 under different load conditions does not affect the loop stability according to some embodiments.

In another embodiment, if the management monitoring component 1250 determines that the feedback signal 1298 (e.g., $V_{FB}$) is smaller than a feedback threshold (e.g., $V_{FB\_th}$), the current sensing signal 1294 (e.g., $V_{cs}$ that represents the peak magnitude of the current 1293) is smaller than a current sensing threshold (e.g., $V_{cs\_th}$), and the chip supply voltage 1296 (e.g., $V_{DD}$) is lower than a supply lower threshold (e.g., $V_{DD\_th\_l}$), the management monitoring component 1250 sends the monitoring signal 1251 to the management control component 1252 and in response the converter 1200 operates in Region II (e.g., as shown in FIG. 6). For example, the management control component 1252 generates the management control signal 1253, which is received by the gate driver 1230, the oscillator 1240, the protection component 1242, and the current and voltage generator 1244 to adjust the power consumption or power down some functional blocks. In another example, in Region II, the functional block for overvoltage protection, the functional block for over-temperature protection, the functional block for over-current protection, and/or the functional block for over-power protection are powered down.

In yet another embodiment, if the management monitoring component 1250 determines that the feedback signal 1298 (e.g., $V_{FB}$) is smaller than the feedback threshold (e.g., $V_{FB\_th}$), the current sensing signal 1294 (e.g., $V_{cs}$ that represents the peak magnitude of the current 1293) is smaller than the current sensing threshold (e.g., $V_{cs\_th}$), and the chip supply voltage 1296 (e.g., $V_{DD}$) is higher than the supply upper threshold (e.g., $V_{DD\_th\_h}$), the management monitoring component 1250 sends the monitoring signal 1251 to the management control component 1252 and in response the converter 1200 operates in Region I (e.g., as shown in FIG. 6). For example, in Region I, the current consumption of the chip 1210 is larger than in Region II. In yet another example, an extra current path is provided to discharge the capacitor 150 in order to prevent the chip supply voltage 1296 (e.g., $V_{DD}$) from drifting even higher. In yet another example, the converter 1200 operates in Region II when the management control signal 1253 is at a logic low level (or at a logic high level), and the converter 1200 operates in Region IV when the management control signal 1253 is at the logic high level (or at the logic low level). In yet another example, the management control signal 1253 includes two or more logic control signals, and the converter 1200 operates in different Regions (e.g., as shown in FIG. 6) based on the states of the two or more logic control signals.

According to another embodiment, a system controller for regulating a power conversion system includes a signal generator configured to receive a feedback signal related to an output signal of a power conversion system, a current sensing signal and an input voltage, and to generate a control signal based on at least information associated with the feedback signal, the current sensing signal and the input voltage, the current sensing signal representing one or more peak magnitudes related to a primary current flowing through a primary winding of the power conversion system, and one or more power-consumption components configured to receive the control signal. The one or more power-consumption components are further configured to reduce power consumption if the control signal indicates the feedback signal is smaller than a feedback threshold for a first predetermined period of time, the current sensing signal is smaller than a current sensing threshold for a second predetermined period of time, and the input voltage is smaller than a first threshold for a third predetermined period of time in magnitude. Each of the first predetermined period of time, the second predetermined period of time, and the third predetermined period of time is equal to or larger than zero in magnitude. For example, the system is implemented according to at least FIG. 5, FIG. 6, FIG. 7, FIG. 8, FIG. 9, FIG. 10, and/or FIG. 11.

According to another embodiment, a system controller for regulating a power conversion system includes a signal generator configured to receive a feedback signal related to an output signal of a power conversion system, a current sensing signal and an input voltage, and to generate a control signal based on at least information associated with the feedback signal, the current sensing signal and the input voltage, the current sensing signal representing one or more peak magnitudes related to a primary current flowing through a primary winding of the power conversion system, and one or more power-consumption components configured to receive the control signal. The one or more power-consumption components are further configured to reduce power consumption if the control signal indicates the feedback signal is larger than a feedback threshold for a first predetermined period of time, the current sensing signal is smaller than a current sensing threshold for a second predetermined period of time, and the input voltage is smaller than a first threshold for a third predetermined period of time in magnitude. Each of the first predetermined period of time, the second predetermined period of time, and the third predetermined period of time is equal to or larger than zero in magnitude. For example, the system is implemented according to at least FIG. 5, FIG. 6, FIG. 7, FIG. 8, FIG. 9, FIG. 10, and/or FIG. 11.

According to yet another embodiment, a system controller for regulating a power conversion system includes a first resistor including a first resistor terminal and a second resistor terminal, the first resistor terminal being biased to a first predetermined voltage, a second resistor including a third resistor terminal and a fourth resistor terminal, the third resistor terminal being connected to the second resistor terminal, the fourth resistor terminal configured to receive a feedback signal related to an output signal of a power conversion system, a transistor including a first transistor terminal, a second transistor terminal, and a third transistor terminal, the first transistor terminal being connected to the second resistor terminal and the third resistor terminal, the second transistor terminal being configured to receive a second predetermined voltage, the third transistor terminal being configured to receive the feedback signal, a modulation component configured to receive the feedback signal and generate a modulation signal, and a gate driver configured to receive the modulation signal and output a drive signal to a switch for adjusting a primary current flowing through a primary winding of the power conversion system. For example, the system is implemented according to at least FIG. 9.

According to yet another embodiment, a method for regulating a power conversion system includes receiving a feedback signal related to an output signal of a power conversion system, a current sensing signal and an input voltage, the current sensing signal representing one or more peak magnitudes related to a primary current flowing through a primary winding of the power conversion system, processing information associated with the feedback signal, the current sensing signal and the input voltage, and generating a control signal based on at least information associated with the feedback signal, the current sensing signal and the input voltage. The method further includes receiving the control signal, processing information associated with the control signal, and, if the control signal indicates the feedback signal is smaller than a feedback threshold for a first predetermined period of time, the current sensing signal is smaller than a current sensing threshold for a second predetermined period of time, and the input voltage is smaller than a first threshold for a third predetermined period of time in magnitude, reducing power consumption of one or more power consumption components. Each of the first predetermined period of time, the second predetermined period of time, and the third predetermined period of time is equal to or larger than zero in magnitude. For example, the method is implemented according to at least FIG. 5, FIG. 6, FIG. 7, FIG. 8, FIG. 9, FIG. 10, and/or FIG. 11.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for a power conversion system, the apparatus comprising:
   one or more power-consumption components configured to receive a first signal associated with a feedback signal, a current sensing signal and an input voltage, the feedback signal being related to an output signal of a power conversion system, the current sensing signal representing one or more peak magnitudes related to a current flowing through a primary winding of the power conversion system;
   wherein:
      the one or more power-consumption components are further configured to reduce power consumption in response to the feedback signal being smaller than a feedback threshold in magnitude for a first predetermined period of time, the current sensing signal being smaller than a current sensing threshold in magnitude for a second predetermined period of time, and the input voltage being smaller than a first threshold in magnitude for a third predetermined period of time; and
      each of the first predetermined period of time, the second predetermined period of time, and the third predetermined period of time is equal to or larger than zero in magnitude.

2. The apparatus of claim 1 wherein each of the first predetermined period of time, the second predetermined period of time, and the third predetermined period of time is larger than zero in magnitude.

3. The apparatus of claim 1 wherein the first predetermined period of time, the second predetermined period of time, and the third predetermined period of time each are equal to zero in magnitude.

4. The apparatus of claim 1, further comprising a signal generator configured to determine whether the feedback signal is smaller than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

5. The apparatus of claim 1 wherein the one or more power-consumption components include a resistor configured to increase corresponding resistance in response to the first signal indicating the feedback signal is smaller than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

6. The apparatus of claim 1 wherein the one or more power-consumption components include one or more functional components configured to be powered off in response to the first signal indicating the feedback signal is smaller than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

7. The apparatus of claim 6 wherein:
   the one or more power-consumption components are further configured to increase power consumption in response to the first signal indicating the feedback signal is smaller than the feedback threshold in magnitude for the first predetermined period of time, the current sensing signal is smaller than the current sensing threshold in magnitude for the second predetermined period of time, and the input voltage is larger than a second threshold in magnitude for a fourth predetermined period of time;
   the second threshold is larger than the first threshold; and
   the fourth predetermined period of time is equal to or larger than zero in magnitude.

8. The apparatus of claim 7, and further comprising:
   a signal generator configured to determine whether the feedback signal is smaller than the feedback threshold in magnitude for the first predetermined period of time;
   wherein:
      the current sensing signal is smaller than the current sensing threshold in magnitude for the second predetermined period of time; and
      the input voltage is larger than the second threshold in magnitude for the fourth predetermined period of time.

9. The apparatus of claim 8 wherein the fourth predetermined period of time is larger than zero in magnitude.

10. The apparatus of claim 8 wherein the signal generator includes:
    a feedback-monitoring component configured to receive the feedback signal and the feedback threshold and generate a feedback comparison signal based on at least information associated with the feedback signal and the feedback threshold, the feedback comparison signal indicating whether the feedback signal remains smaller than the feedback threshold for the first predetermined period of time;
    a current-sensing-monitoring component configured to receive the current sensing signal and the current sensing threshold and generate a current-sensing comparison signal based on at least information associated with the current sensing signal and the current sensing threshold, the current-sensing comparison signal indicating whether the current sensing signal remains smaller than the current sensing threshold for the second predetermined period of time;
    a first monitoring component configured to receive the input voltage and the first threshold and generate a first comparison signal based on at least information associated with the input voltage and the first threshold, the first comparison signal indicating whether the input voltage remains smaller than the first threshold for the third predetermined period of time; and
    a second monitoring component configured to receive the input voltage and the second threshold and generate a second comparison signal based on at least information associated with the input voltage and the second threshold, the second comparison signal indicating whether the input voltage remains larger than the second threshold for the fourth predetermined period of time.

11. The apparatus of claim 10 wherein the signal generator further includes a pattern-recognition component configured to receive the feedback comparison signal, the current-sensing comparison signal, the first comparison signal and the second comparison signal, and is further configured to affect the first signal to indicate whether the feedback signal is smaller than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

12. The apparatus of claim 11 wherein the pattern-recognition component is further configured to affect the first signal to indicate whether the feedback signal is smaller than the feedback threshold in magnitude for the first predetermined period of time, the current sensing signal is smaller than the current sensing threshold in magnitude for the second predetermined period of time, and the input voltage is larger than the second threshold in magnitude for the fourth predetermined period of time.

13. The apparatus of claim 7 wherein the first predetermined period of time, the second predetermined period of time, the third predetermined period of time, and the fourth predetermined period of time each are equal to zero in magnitude.

14. The apparatus of claim 1 wherein the one or more power-consumption components include a gate driver configured to receive the first signal and reduce one or more corresponding currents in response to the first signal indicating that the feedback signal is smaller than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

15. The apparatus of claim 1 wherein the one or more power-consumption components include a protection circuit configured to receive the first signal and reduce one or more corresponding currents in response to the first signal indicating that the feedback signal is smaller than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

16. The apparatus of claim 15 wherein the protection circuit includes one selected from a group consisting of an over-temperature protection component, an over-power protection component, an over-voltage protection component, an over-current protection component, and an under-voltage lockout component.

17. The apparatus of claim 1 wherein the one or more power-consumption components include an oscillator configured to receive the first signal and reduce one or more corresponding currents in response to the first signal indicating that the feedback signal is smaller than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

18. The apparatus of claim 1 wherein the one or more power-consumption components include a current and voltage generator configured to receive the first signal and reduce one or more corresponding currents in response to the first signal indicating that the feedback signal is smaller than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

19. The apparatus of claim 1 wherein the first signal includes one or more logic signals, each of the one or more logic signals corresponds to a logic high level or a logic low level.

20. The apparatus of claim 1 wherein the one or more power-consumption components include:
a first resistor including a first resistor terminal and a second resistor terminal, the first resistor terminal being biased to a first predetermined voltage; and
a second resistor including a third resistor terminal and a fourth resistor terminal, the third resistor terminal being connected to the second resistor terminal, the fourth resistor terminal configured to receive the feedback signal.

21. The apparatus of claim 20 wherein the one or more power-consumption components further include a transistor including a first transistor terminal, a second transistor terminal, and a third transistor terminal, the first transistor terminal being connected to the second resistor terminal and the third resistor terminal, the second transistor terminal being configured to receive the first signal, the third transistor terminal being configured to receive the feedback signal.

22. The apparatus of claim 20 wherein the one or more power-consumption components further include a transistor including a first transistor terminal, a second transistor terminal, and a third transistor terminal, the first transistor terminal being configured to receive the first predetermined voltage, the second transistor terminal being configured to receive the first signal, the third transistor terminal being connected to the second resistor terminal and the third resistor terminal.

23. The apparatus of claim 1, and further comprising:
a feedback terminal configured to provide the feedback signal to a signal generator configured to generate the first signal;
wherein:
an impedance associated with the feedback terminal is configured to change with an output load of the power conversion system.

24. The apparatus of claim 1, further comprising:
a signal generator, the signal generator including:
a feedback-monitoring component configured to receive the feedback signal and the feedback threshold and generate a feedback comparison signal based on at least information associated with the feedback signal and the feedback threshold, the feedback comparison signal indicating whether the feedback signal remains smaller than the feedback threshold for the first predetermined period of time;
a current-sensing-monitoring component configured to receive the current sensing signal and the current sensing threshold and generate a current-sensing comparison signal based on at least information associated with the current sensing signal and the current sensing threshold, the current-sensing comparison signal indicating whether the current sensing signal remains smaller than the current sensing threshold for the second predetermined period of time; and
a first monitoring component configured to receive the input voltage and the first threshold and generate a first comparison signal based on at least information associated with the input voltage and the first threshold, the first comparison signal indicating whether the input voltage remains smaller than the first threshold for the third predetermined period of time.

25. An apparatus comprising:
one or more power-consumption components configured to receive a first signal associated with a feedback signal, a current sensing signal and an input voltage, the feedback signal being related to an output signal of a power conversion system, the current sensing signal representing one or more peak magnitudes related to a current flowing through a primary winding of the power conversion system;
wherein:
the one or more power-consumption components are further configured to reduce power consumption in response to the first signal indicating the feedback signal is larger than a feedback threshold in magnitude for a first predetermined period of time, the current sensing signal is smaller than a current sensing threshold in magnitude for a second predetermined period of time, and the input voltage is smaller than a first threshold in magnitude for a third predetermined period of time; and
each of the first predetermined period of time, the second predetermined period of time, and the third predetermined period of time is equal to or larger than zero in magnitude.

26. The apparatus of claim 25 wherein each of the first predetermined period of time, the second predetermined period of time, and the third predetermined period of time is larger than zero in magnitude.

27. The apparatus of claim 25 wherein the first predetermined period of time, the second predetermined period of time, and the third predetermined period of time each are equal to zero in magnitude.

28. The apparatus of claim 25, further comprising a signal generator configured to determine whether the feedback signal is larger than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time.

29. The apparatus of claim 25, and further comprising:
a feedback terminal configured to provide the feedback signal to a signal generator configured to generate the first signal;
wherein:
an impedance associated with the feedback terminal is configured to change with an output load of the power conversion system.

30. An apparatus for a power conversion system, the apparatus comprising:
a first resistor including a first resistor terminal and a second resistor terminal, the first resistor terminal being biased to a first predetermined voltage;
a second resistor including a third resistor terminal and a fourth resistor terminal, the third resistor terminal being connected to the second resistor terminal, the fourth resistor terminal configured to receive a feedback signal related to an output signal of a power conversion system;
a transistor including a first transistor terminal, a second transistor terminal, and a third transistor terminal, the first transistor terminal being connected to the second resistor terminal and the third resistor terminal, the second transistor terminal being configured to receive a second predetermined voltage, the third transistor terminal being configured to receive the feedback signal; and
a modulation-and-drive component configured to receive the feedback signal and output a drive signal to a switch for adjusting a current flowing through a primary winding of the power conversion system.

31. The apparatus of claim 30, and further comprising:
a signal generator configured to receive the feedback signal, a current sensing signal and an input voltage, and to generate a first signal based on at least information associated with the feedback signal, the current sensing signal and the input voltage, the current sensing signal representing one or more peak magnitudes related to the current flowing through the primary winding of the power conversion system; and
one or more power-consumption components configured to receive the first signal;
wherein:
the signal generator is further configured to determine whether the feedback signal is larger than a feedback threshold in magnitude for a first predetermined period of time, the current sensing signal is smaller than a current sensing threshold in magnitude for a second predetermined period of time, and the input voltage is smaller than a first threshold in magnitude for a third predetermined period of time;
the one or more power-consumption components are further configured to reduce power consumption in response to the first signal indicating the feedback signal is larger than the feedback threshold in magnitude for the first predetermined period of time, the current sensing signal is smaller than the current sensing threshold in magnitude for the second predetermined period of time, and the input voltage is smaller than the first threshold in magnitude for the third predetermined period of time; and
each of the first predetermined period of time, the second predetermined period of time, and the third predetermined period of time is equal to or larger than zero in magnitude.

32. The apparatus of claim 31 wherein each of the first predetermined period of time, the second predetermined period of time, and the third predetermined period of time is larger than zero in magnitude.

33. The apparatus of claim 31 wherein the transistor includes a P-channel field effect transistor.

34. The apparatus of claim 33 wherein the first transistor terminal includes a source terminal, the second transistor terminal includes a gate terminal, and the third transistor terminal includes a drain terminal.

35. The apparatus of claim 34 wherein the first predetermined voltage is larger than the second predetermined voltage in magnitude.

36. The apparatus of claim 31 wherein the modulation-and-drive component includes:
a comparator configured to receive the feedback signal and the current sensing signal and generate a comparison signal based on at least information associated with the feedback signal and the current sensing signal; and
a logic component configured to receive the comparison signal and output a modulation signal based on at least information associated with the comparison signal.

37. The apparatus of claim 31, and further comprising:
a feedback terminal configured to provide the feedback signal to the signal generator;

wherein:
an impedance associated with the feedback terminal is configured to change with an output load of the power conversion system.

38. The apparatus of claim 31 wherein the first predetermined period of time, the second predetermined period of time, and the third predetermined period of time each are equal to zero in magnitude.

39. A method for a power conversion system, the method comprising:
receiving a first signal associated with a current sensing signal, an input voltage, and a feedback signal, the feedback signal being related to an output signal of a power conversion system, the current sensing signal representing one or more peak magnitudes related to a current flowing through a primary winding of the power conversion system;
processing information associated with the first signal; and
in response to the first signal indicating the feedback signal is smaller than a feedback threshold in magnitude for a first predetermined period of time, the current sensing signal is smaller than a current sensing threshold in magnitude for a second predetermined period of time, and the input voltage is smaller than a first threshold in magnitude for a third predetermined period of time, reducing power consumption of one or more power consumption components;
wherein:
each of the first predetermined period of time, the second predetermined period of time, and the third predetermined period of time is equal to or larger than zero in magnitude.

40. The method of claim 39 wherein each of the first predetermined period of time, the second predetermined period of time, and the third predetermined period of time is larger than zero in magnitude.

41. The method of claim 39 wherein the first predetermined period of time, the second predetermined period of time, and the third predetermined period of time each are equal to zero in magnitude.

* * * * *